United States Patent
Su et al.

(10) Patent No.: US 11,082,199 B2
(45) Date of Patent: Aug. 3, 2021

(54) DATA TRANSMISSION METHOD IN OPTICAL NETWORK AND OPTICAL NETWORK DEVICE

(71) Applicant: Huawei Technologies Co., Ltd., Shenzhen (CN)

(72) Inventors: Wei Su, Chengdu (CN); Qiuyou Wu, Dongguan (CN); Junling Xiang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/843,520

(22) Filed: Apr. 8, 2020

(65) Prior Publication Data

US 2020/0235905 A1    Jul. 23, 2020

Related U.S. Application Data

(63) Continuation of application No. PCT/CN2018/072144, filed on Jan. 10, 2018.

(30) Foreign Application Priority Data

Oct. 9, 2017  (WO) ................ PCT/CN2017/105306

(51) Int. Cl.
*H04B 10/27* (2013.01)
*H04L 7/00* (2006.01)

(52) U.S. Cl.
CPC ........... *H04L 7/0075* (2013.01); *H04B 10/27* (2013.01)

(58) Field of Classification Search
CPC ....... H04L 7/0075; H04B 10/27; H04J 14/023
See application file for complete search history.

(56) References Cited

U.S. PATENT DOCUMENTS 9,288,006 B1   3/2016 Mok et al.
9,525,482 B1   12/2016 Tse
(Continued)

FOREIGN PATENT DOCUMENTS

CN    101489157 A    7/2009
CN    101707553 A    5/2010
(Continued)

OTHER PUBLICATIONS

Lometti, A. et al., "Extending the Scope of OTN to Access and Metro Networks," 2017 19th International Conference on Transparent Optical Networks (ICTON), XP33147668A, Jul. 2, 2017, 4 pages.

(Continued)

*Primary Examiner* — Dzung D Tran
(74) *Attorney, Agent, or Firm* — Slater Matsil, LLP

(57) ABSTRACT

This application provides a data transmission method in an optical network and an optical network device. The method includes: obtaining, by a first device, first synchronization information from a first service data stream, and determining a to-be-transmitted service data stream; generating second synchronization information based on the first synchronization information; mapping the second synchronization information and the to-be-transmitted service data stream to an optical carrier container; and sending the optical carrier container. A second device receives the optical carrier container; obtains a second service data stream and third synchronization information from the optical carrier container through demapping; generates fourth synchronization information based on the third synchronization information; and inserts the fourth synchronization information into the second service data stream, to obtain a third service data stream. In this way, time synchronization precision is improved.

20 Claims, 17 Drawing Sheets

(56) References Cited

U.S. PATENT DOCUMENTS

| | | | | |
|---|---|---|---|---|
| 2004/0001516 A1* | 1/2004 | Friedrichs | ............ | H04J 3/0691 |
| | | | | 370/506 |
| 2015/0207585 A1* | 7/2015 | Luo | ................ | H04J 14/0275 |
| | | | | 398/72 |
| 2016/0218818 A1 | 7/2016 | Lorenz et al. | | |
| 2019/0068284 A1* | 2/2019 | Gareau | ................ | H04B 10/27 |
| 2020/0169378 A1* | 5/2020 | Ruffini | ................ | H04J 3/0638 |

FOREIGN PATENT DOCUMENTS

| | | |
|---|---|---|
| CN | 101997669 A | 3/2011 |
| CN | 102195885 A | 9/2011 |
| CN | 103297165 A | 9/2013 |
| CN | 103780488 A | 5/2014 |
| CN | 103986658 A | 8/2014 |
| CN | 105451102 A | 3/2016 |
| CN | 106992838 A | 7/2017 |
| EP | 2448168 A1 | 5/2012 |
| WO | 2015104054 A1 | 7/2015 |

OTHER PUBLICATIONS

"Common Public Radio Interface: eCPRI Interface Specification," eCPRI Specification V1.0, XP055597890, Aug. 22, 2017, 62 pages.
"Consideration of CPRI Clock Transport Over OTN," Questions: 11, 13/25, Study Group 15—Contribution 1821, Source: Huawei Technologies Co., Ltd., COM 15-C1821-E, XP44166103A, May 2016, 5 pages.

* cited by examiner

Columns

|   | 1 | 256 | 512 | 128 bits | | | | | | | | | 128 x 5140 | |
|---|---|---|---|---|---|---|---|---|---|---|---|---|---|---|
| Superrow | | | | | | | | | | | | | | |
| 1 | AM | OH | TS A.1 | TS A.2 | TS A.3 | ... | TS A.47 | TS A.48 | TS A.1 | TS A.2 | TS A.3 | ... | TS A.32 | TS A.33 |

CONT.
FROM
FIG. 8A

| | | | | | | | | | | | | | | |
|---|---|---|---|---|---|---|---|---|---|---|---|---|---|---|
| 000 | AM | OH | TS A.1 | TS A.2 | TS A.3 | ... | TS A.47 | TS A.48 | TS A.1 | TS A.2 | TS A.3 | ... | TS A.47 | TS A.48 |
| 001 | AM | OH | TS A.1 | TS A.2 | TS A.3 | ... | TS A.47 | TS A.48 | TS A.1 | TS A.2 | TS A.3 | ... | TS A.47 | TS A.48 |
| 010 | AM | OH | TS A.1 | TS A.2 | TS A.3 | ... | TS A.47 | TS A.48 | TS A.1 | TS A.2 | TS A.3 | ... | TS A.47 | TS A.48 |
| 011 | AM | OH | TS A.1 | TS A.2 | TS A.3 | ... | TS A.47 | TS A.48 | TS A.1 | TS A.2 | TS A.3 | ... | TS A.47 | TS A.48 |
| 100 | AM | OH | TS A.1 | TS A.2 | TS A.3 | ... | TS A.47 | TS A.48 | TS A.1 | TS A.2 | TS A.3 | ... | TS A.47 | TS A.48 |
| 101 | AM | OH | TS A.1 | TS A.2 | TS A.3 | ... | TS A.47 | TS A.48 | TS A.1 | TS A.2 | TS A.3 | ... | TS A.47 | TS A.48 |
| 110 | AM | OH | TS A.1 | TS A.2 | TS A.3 | ... | TS A.47 | TS A.48 | TS A.1 | TS A.2 | TS A.3 | ... | TS A.47 | TS A.48 |
| 111 | AM | OH | TS A.1 | TS A.2 | TS A.3 | ... | TS A.47 | TS A.48 | TS A.1 | TS A.2 | TS A.3 | ... | TS A.47 | TS A.48 |

001 ⎱ (rows 000–111)

| 101 | | | | | | | | | | | | | | | |
|---|---|---|---|---|---|---|---|---|---|---|---|---|---|---|---|
| | 000 | AM | OH | TS A.1 | TS A.2 | TS A.3 | ... | TS A.47 | TS A.48 | TS A.1 | TS A.2 | TS A.3 | ... | TS A.47 | TS A.48 |
| | 001 | AM | OH | TS A.1 | TS A.2 | TS A.3 | ... | TS A.47 | TS A.48 | TS A.1 | TS A.2 | TS A.3 | ... | TS A.47 | TS A.48 |
| | 010 | AM | OH | TS A.1 | TS A.2 | TS A.3 | ... | TS A.47 | TS A.48 | TS A.1 | TS A.2 | TS A.3 | ... | TS A.47 | TS A.48 |
| | 011 | AM | OH | TS A.1 | TS A.2 | TS A.3 | ... | TS A.47 | TS A.48 | TS A.1 | TS A.2 | TS A.3 | ... | TS A.47 | TS A.48 |
| | 100 | AM | OH | TS A.1 | TS A.2 | TS A.3 | ... | TS A.47 | TS A.48 | TS A.1 | TS A.2 | TS A.3 | ... | TS A.47 | TS A.48 |
| | 101 | AM | OH | TS A.1 | TS A.2 | TS A.3 | ... | TS A.47 | TS A.48 | TS A.1 | TS A.2 | TS A.3 | ... | TS A.47 | TS A.48 |
| | 110 | AM | OH | TS A.1 | TS A.2 | TS A.3 | ... | TS A.47 | TS A.48 | TS A.1 | TS A.2 | TS A.3 | ... | TS A.47 | TS A.48 |
| | 111 | AM | OH | TS A.1 | TS A.2 | TS A.3 | ... | TS A.47 | TS A.48 | TS A.1 | TS A.2 | TS A.3 | ... | TS A.47 | TS A.48 |

CONT. FROM FIG. 8B

| 4 bytes | 2 bytes | Fixed | 1 byte |
|---|---|---|---|
| Flag field | Payload length field | Payload area | Check field |

DATA TRANSMISSION METHOD IN OPTICAL NETWORK AND OPTICAL NETWORK DEVICE

CROSS-REFERENCE TO RELATED APPLICATIONS

This application is a continuation of International Application No. PCT/CN2018/072144, filed on Jan. 10, 2018, which claims priority to International Patent Application No. PCT/CN2017/105306, filed on Oct. 9, 2017. The disclosures of the aforementioned applications are hereby incorporated by reference in their entireties.

TECHNICAL FIELD

This application relates to the field of wireless communications, and in particular, to a data transmission method in an optical network and an optical network device.

BACKGROUND

Currently, 5th generation (5G) wireless technologies are gradually being standardized and commercialized, mainly oriented to three application scenarios: enhanced mobile broadband (eMBB), Massive Machine Type Communication (mMTC), and ultra-reliable and low-latency communication (uRLLC). Low latency, large bandwidth, network slicing, high-precision time synchronization, and the like become key technical features of the 5th generation wireless technologies and are also main requirements for a transport network. As a core technology of a next-generation transport network, an optical transport network (OTN) has an abundant operation, administration, and maintenance (OAM) capability, a strong tandem connection monitoring (TCM) capability, and an out-of-band forward error correction (FEC) capability, and can implement flexible scheduling and management of a large-capacity service. Due to these features, the OTN technology has gradually become a mainstream technology for a backbone transport network and is to be used for 5G transport.

Currently, in a process of transmitting a wireless service by using an OTN, fronthaul of the wireless service is completed by using a transparent transmission method. For example, bits of a common public radio interface (CPRI) service are directly and synchronously mapped to an optical data unit flexible (ODUflex), and then the ODUflex is multiplexed into an optical transport unit k (OTUk) for transmission. However, because of asymmetry in uplink and downlink paths and internal processing of OTN transmission, uplink and downlink transmission delays differ greatly. Therefore, if the transparent transmission method is still used, high-precision time synchronization performance cannot be provided, and a requirement of a 5G service cannot be met.

SUMMARY

This application provides a data transmission method in an optical network and an optical network device, to resolve a problem in the prior art that time synchronization precision is not high.

According to a first aspect, this application provides a data transmission method in an optical network, including obtaining, by a first device, first synchronization information from a first service data stream, and determining a to-be-transmitted service data stream, generating, by the first device, second synchronization information based on the first synchronization information, mapping, by the first device, the second synchronization information and the to-be-transmitted service data stream to an optical carrier container, and sending, by the first device, the optical carrier container.

In a possible design, the obtaining, by a first device, first synchronization information from a first service data stream, and determining a to-be-transmitted service data stream includes obtaining, by the first device, the first synchronization information from the first service data stream, and deleting, by the first device, the first synchronization information from the first service data stream, to obtain the to-be-transmitted service data stream.

In a possible design, after the deleting, by the first device, the first synchronization information from the first service data stream, to obtain the to-be-transmitted service data stream, the method further includes marking, by the first device, a location of the first synchronization information in the to-be-transmitted service data stream.

In a possible design, the to-be-transmitted service data stream is the first service data stream.

In a possible design, the mapping, by the first device, the second synchronization information and the to-be-transmitted service data stream to an optical carrier container includes mapping, by the first device, the second synchronization information to a slot corresponding to the second synchronization information in the optical carrier container, and mapping the to-be-transmitted service data stream to a slot corresponding to the to-be-transmitted service data stream in the optical carrier container.

In a possible design, the mapping, by the first device, the second synchronization information and the to-be-transmitted service data stream to an optical carrier container includes mapping, by the first device, the second synchronization information to an overhead area in the optical carrier container, and mapping the to-be-transmitted service data stream to a slot corresponding to the to-be-transmitted service data stream in the optical carrier container.

In a possible design, the optical carrier container includes a flexible optical transport network frame structure, and the flexible optical transport network frame structure includes an alignment marker, an overhead area, and a payload area, and the payload area is divided into a plurality of slots.

According to a second aspect, this application provides an optical network device. The device includes a processor and a transceiver, configured to support the method mentioned in the first aspect and the possible designs of the first aspect. Specifically, the transceiver is configured to perform receiving and sending actions in the method, and the processor is configured to support other processing steps in the method.

According to a third aspect, this application provides a data transmission method in an optical network, including receiving, by a second device, an optical carrier container, obtaining, by the second device, a second service data stream and third synchronization information from the optical carrier container through demapping, generating, by the second device, fourth synchronization information based on the third synchronization information, and inserting, by the second device, the fourth synchronization information into the second service data stream, to obtain a third service data stream.

In a possible design, the inserting, by the second device, the fourth synchronization information into the second service data stream, to obtain a third service data stream includes if the second service data stream includes original synchronization information, replacing, by the second device, the original synchronization information with the fourth synchronization information, to obtain the third service data stream.

In a possible design, the inserting, by the second device, the fourth synchronization information into the second service data stream, to obtain a third service data stream includes if the second service data stream does not comprise synchronization information, inserting, by the second device, the fourth synchronization information into the second service data stream based on a location marker of original synchronization information in the second service data stream, to obtain the third service data stream.

According to a fourth aspect, this application provides an optical network device. The device includes a processor and a transceiver, configured to support the method mentioned in the third aspect and the possible designs of the third aspect. Specifically, the transceiver is configured to perform receiving and sending actions in the method, and the processor is configured to support other processing steps in the method.

According to the data transmission method in the optical network and the optical network device, the first device obtains the first synchronization information from the first service data stream, and determines the to-be-transmitted service data stream, generates the second synchronization information based on the first synchronization information, maps the second synchronization information and the to-be-transmitted service data stream to the optical carrier container, and sends the optical carrier container. After receiving the optical carrier container, the second device may obtain the second service data stream and the third synchronization information in the optical carrier container, generate the fourth synchronization information based on the third synchronization information, insert the fourth synchronization information into the second service data stream, to obtain the third service data stream, and then send the third service data stream. In this way, time synchronization precision is improved.

According to a fifth aspect, this application provides a data transmission method in an optical network, where the method includes obtaining, by a first device, M service data streams, where M is an integer greater than or equal to 2, classifying, by the first device, packets in the M service data streams based on a preset packet type, to obtain at least one group of service data streams, mapping, by the first device, the at least one group of service data streams to an optical carrier container, and sending, by the first device, the optical carrier container.

In a possible design, the classifying, by the first device, packets in the M service data streams based on a preset packet type, to obtain at least one group of service data streams includes classifying, by the first device, the packets in the M service data streams based on an enhanced common public radio interface (eCPRI) data type, a control and management type, and a synchronization type, to obtain the at least one group of.

In a possible design, the mapping, by the first device, the at least one group of service data streams to an optical carrier container includes at least one of the following mapping, by the first device, a packet of the eCPRI data type in each service data stream to the optical carrier container, combining, by the first device, all packets of the control and management type in the M service data streams, and mapping a combined packet of the control and management type to the optical carrier container, or mapping, by the first device, all packets of the synchronization type in the M service data streams to the optical carrier container.

In a possible design, the classifying, by the first device, the packets in the M service data streams based on an enhanced common public radio interface eCPRI data type, a control and management type, and a synchronization type, to obtain the at least one group of service data streams includes classifying a packet of the eCPRI data type and a packet of the synchronization type into one group of service data streams, and classifying a packet of the control and management type into one group of service data streams, to obtain the at least one group of service data streams.

In a possible design, the mapping, by the first device, the at least one group of service data streams to an optical carrier container includes at least one of the following mapping, by the first device, a packet of the eCPRI data type in each service data stream to the optical carrier container, combining, by the first device, all packets of the control and management type in the M service data streams, and mapping a combined packet of the control and management type to the optical carrier container, or mapping, by the first device, each packet of the synchronization type to an overhead area of a location in the optical carrier container to which a corresponding packet of the eCPRI data type is mapped.

In a possible design, after the mapping, by the first device, the at least one group of service data streams to an optical carrier container, the method further includes generating, by the first device, indication information, where the indication information is used to indicate a start location of the first eCPRI data packet of each packet of the eCPRI data type in the optical carrier container, and adding, by the first device, the indication information to the optical carrier container.

In a possible design, before the combining, by the first device, all packets of the control and management type in the M service data streams, and mapping a combined packet of the control and management type to the optical carrier container, the method further includes adding, by the first device, a data stream identifier to each packet of the control and management type, where the data stream identifier is used to indicate a service data stream to which the packet of the control and management type belongs.

In a possible design, the optical carrier container is a flexible optical transport network frame structure.

According to a sixth aspect, this application provides an optical network device. The device includes a processor and a transceiver, configured to support the method mentioned in the fifth aspect and the possible designs of the fifth aspect. Specifically, the transceiver is configured to perform receiving and sending actions in the method, and the processor is configured to support other processing steps in the method.

According to a seventh aspect, this application provides a data transmission method in an optical network, where the method includes receiving, by a second device, an optical carrier container sent by a first device, and parsing, by the second device, the optical carrier container to obtain at least one group of service data streams based on a preset packet type, where the service data streams are obtained by reorganizing classified packets in M service data streams, where M is an integer greater than or equal to 2.

In a possible design, the at least one group of service data streams based on the preset packet type are specifically at least one group of service data streams that are obtained by classifying the packets in the M service data streams based on an enhanced common public radio interface eCPRI data type, a control and management type, and a synchronization type.

In a possible design, a packet of the eCPRI data type and a packet of the synchronization type are classified into one group of service data streams, and a packet of the control and management type is classified into one group of service data streams.

In a possible design, the parsing, by the second device, the optical carrier container to obtain at least one group of service data streams based on a preset packet type includes determining, by the second device, a start location of the first eCPRI data packet of each packet of the eCPRI data type in the optical carrier container based on indication information in the optical carrier container, and obtaining the packet of the eCPRI data type based on the start location of the first eCPRI data packet of the packet of the eCPRI data type in the optical carrier container.

In a possible design, the parsing, by the second device, the optical carrier container to obtain at least one group of service data streams based on a preset packet type includes distinguishing and obtaining, by the second device, the packet of the control and management type through parsing based on a data stream identifier in the optical carrier container.

In a possible design, the optical carrier container is a flexible optical transport network frame structure.

According to an eighth aspect, this application provides an optical network device. The device includes a processor and a transceiver, configured to support the method mentioned in the seventh aspect and the possible designs of the seventh aspect. Specifically, the transceiver is configured to perform receiving and sending actions in the method, and the processor is configured to support other processing steps in the method.

According to a ninth aspect, this application provides a computer storage medium, configured to store a computer software instruction that is used by the device mentioned in the second aspect, the fourth aspect, the sixth aspect, or the eighth aspect, where the computer software instruction includes a program designed to execute the foregoing aspect.

According to a tenth aspect, this application provides a system, where the system includes the optical network devices provided in the second aspect and the fourth aspect.

According to an eleventh aspect, this application provides a system, where the system includes the optical network devices provided in the sixth aspect and the eighth aspect.

According to the data transmission method in the optical network and the optical network device provided in this application, the packets in the service data streams are classified based on the preset packet type, then the classified packets are reorganized into the at least one group of service data streams, and the at least one group of service data streams are mapped to the optical carrier container for sending. After receiving the optical carrier container, the second device obtains these packets through parsing. Without transparently transmitting the service data streams as a whole, classification and reorganization reduce bandwidth waste and improve transmission efficiency.

BRIEF DESCRIPTION OF THE DRAWINGS

The following describes in more details the embodiments of this application with reference to the accompanying drawings.

FIG. 6 is a schematic structural diagram of an optical carrier container according to another embodiment of this application;

FIG. 8A, FIG. 8B, and FIG. 8C are a schematic structural diagram of an optical carrier container according to yet another embodiment of this application;

DETAILED DESCRIPTION OF ILLUSTRATIVE EMBODIMENTS

A network architecture and a service scenario described in the embodiments of this application are intended to more clearly describe the technical solutions in the embodiments of this application, and do not constitute a limitation to the technical solutions provided in the embodiments of this application. A person of ordinary skill in the art may learn that the technical solutions provided in the embodiments of this application are also applicable to a similar technical problem as a network architecture evolves and a new service scenario emerges.

In this application, the concepts "packet" and "frame" are equivalent and can be used interchangeably.

General Overview

The embodiments of this application are applicable to an optical network, for example, an OTN). One OTN is usually constituted by connecting a plurality of devices by using an optical fiber, and different topology types such as a linear topology, a ring topology, and a mesh topology may be formed depending on a specific requirement.

Figure 1:
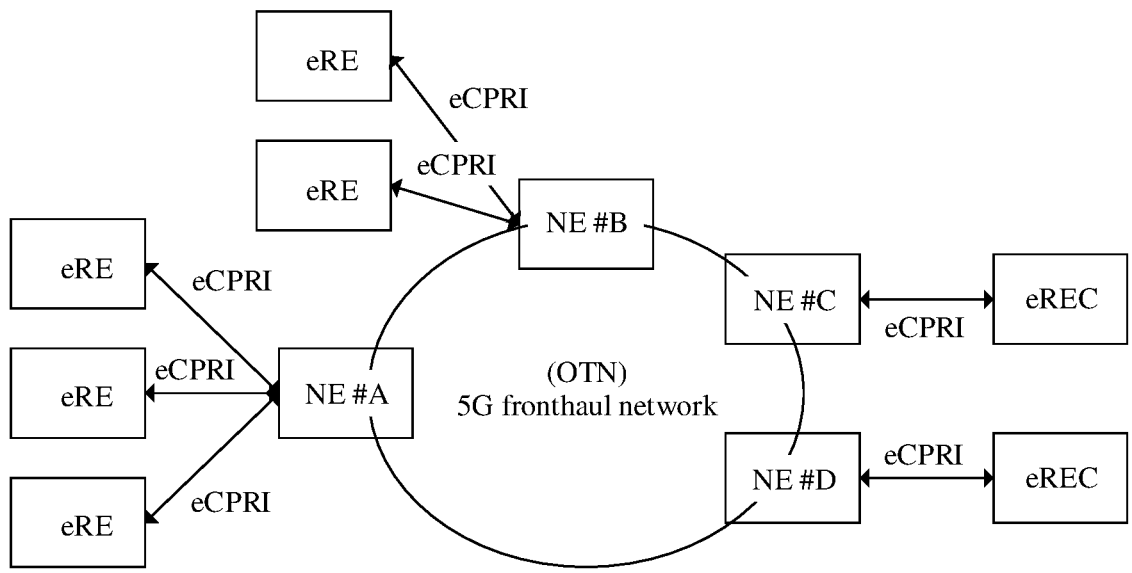
FIG. 1 is a schematic diagram of a possible application scenario according to an embodiment of this application.

FIG. 1 is a schematic diagram of a possible application scenario according to an embodiment of this application. An OTN 5G fronthaul network shown in FIG. 1 includes a plurality of OTN nodes, for example, OTN nodes such as an NE # A, an NE # B, an NE # C, and an NE # D shown in FIG. 1.

The node NE # A connects to three enhanced common public radio interfaces (eCPRI) of a 5G wireless service. Similarly, the NE # B connects to two eCPRIs of a 5G wireless service. The eCPRI is connected to an eCPRI radio equipment (eRE) of a corresponding 5G wireless network.

The NE # C and the NE # D each connect to one eCPRI of a 5G wireless service, and the eCPRI is connected to an eCPRI radio equipment controller (eREC) of a 5G wireless network. These eCPRI services are transmitted over an OTN network to implement interworking between 5G wireless devices such as an eRE and an eREC.

Figure 2:
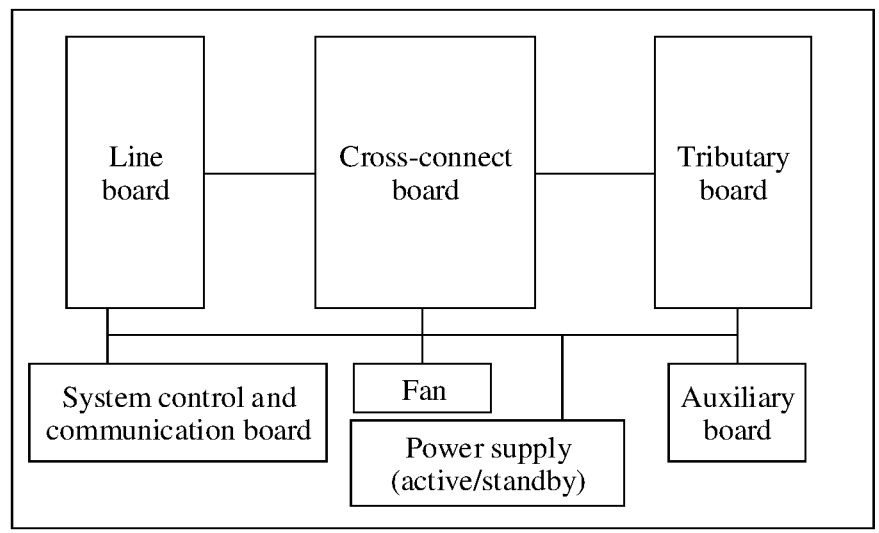
FIG. 2 is a schematic diagram of a possible hardware structure of an optical transport network device.

FIG. 2 is a schematic diagram of a possible hardware structure of an optical transport network device. The OTN device herein may be the OTN node in FIG. 1. Specifically, an OTN device includes a power supply, a fan, and an auxiliary board, and may further include a tributary board, a line board, a cross-connect board, an optical layer processing board, and a system control and communication board.

It should be noted that types and quantities of boards that are specifically included in each device may vary depending on a specific requirement. For example, a network device serving as a core node may have no tributary board. A network device serving as an edge node may have a plurality of tributary boards. The power supply is configured to supply power to the OTN device, and may include an active power supply and a standby power supply. The fan is configured to dissipate heat of the device. The auxiliary board is configured to provide an auxiliary function, for example, providing an external alarm or accessing an external clock. The tributary board, the cross-connect board, and the line board are mainly configured to process electrical-layer signals of an OTN. The tributary board is configured to receive and send various client services, for example, a synchronous digital hierarchy (SDH) service, a packet service, an Ethernet service, and a fronthaul service. Further, the tributary board may be divided into a client-side optical module and a signal processor. The client-side optical module may be an optical transceiver, and is configured to receive and/or send a client signal. The signal processor is configured to implement mapping and demapping between the client signal and an optical data unit (ODU) frame. The cross-connect board is configured to implement ODU frame switching, and complete switching of one or more types of ODU signals. The line board mainly implements processing of an ODU frame on a line side. Specifically, the line board may be divided into a line-side optical module and a signal processor. The line-side optical module may be a line-side optical transceiver, configured to receive and/or send an ODU signal. The signal processor is configured to implement multiplexing and demultiplexing, or mapping and demapping on the ODU frame on the line side. The system control and communication board is configured to implement system control and communication. Specifically, information may be collected from different boards by using a backplane, or a control instruction is sent to a corresponding board. It should be noted that, unless otherwise specified, there may be one or more specific components (for example, a signal processor). This is not limited in this application. It should be further noted that types of boards included in the device and specific function designs and quantities of boards are not limited in this embodiment of this application.

To improve time synchronization precision of OTN transmission, this application proposes a new data transmission method in an optical network.

Figure 3:
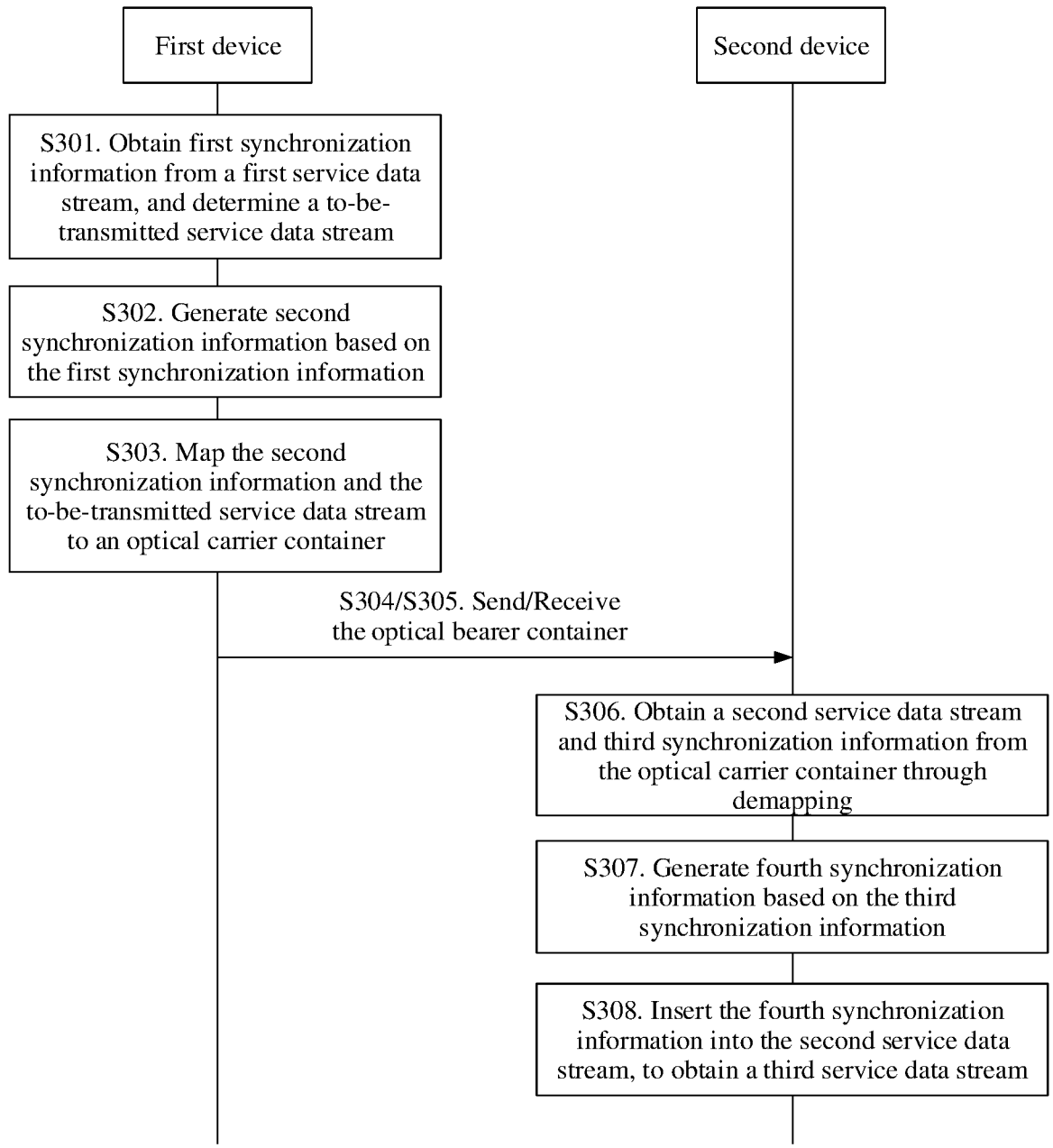
FIG. 3 is a schematic flowchart of a data transmission method in an optical network according to an embodiment of this application.
Figure 4:
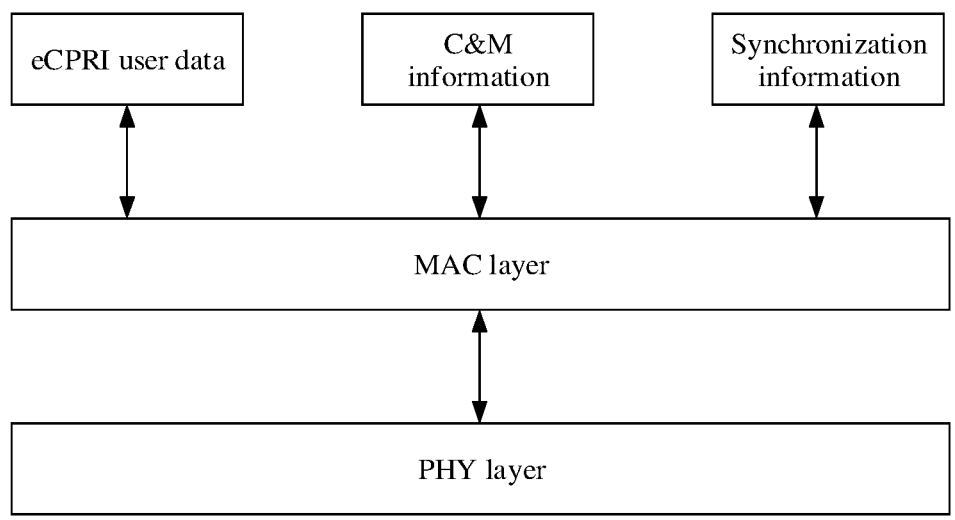
FIG. 4 is a schematic diagram of service transmission in a 5G fronthaul network according to an embodiment of this application.

FIG. 3 is a schematic flowchart of a data transmission method according to an embodiment of this application. FIG. 4 is a schematic diagram of service transmission in a 5G fronthaul network according to an embodiment of this application.

As shown in FIG. 3, the method includes the following steps.

S301. A first device obtains first synchronization information from a first service data stream, and determines a to-be-transmitted service data stream.

The first device is the foregoing OTN device, and the first service data stream may be sent by a 5G wireless device or the like connected to the OTN device, for example, the eRE or the eREC in FIG. 1. This is not limited in this application.

As shown in FIG. 4, a service data stream sent by a second device may include three parts: eCPRI user data, control and management (C&M) information, and synchronization information. In other words, the service data stream may include any one or more of a packet of an eCPRI data type, a packet of a control and management type, and a packet of a synchronization type.

The three parts are all encapsulated into a media access control (MAC) frame at a MAC layer, and after Ethernet physical encoding processing is performed at a physical (PHY) layer, the MAC frame is sent through a standard Ethernet interface, for example, a 10GE or 25GE Ethernet interface. Correspondingly, after receiving the first service data stream, the first device may consider that the first service data stream is a 10GE or 25GE Ethernet data stream.

It should be noted that the synchronization information in this application may be time synchronization information. Further, the synchronization information may include time synchronization information, phase synchronization information, and frequency synchronization information. In other words, time, frequency, and phase synchronization between devices may all be required.

A specific process of obtaining the first synchronization information is as follows. The first device parses the first service data stream, and first obtains a data stream in a physical layer encoding format, for example, a 66B code block data stream, identifies a synchronization packet from the data stream, and extracts synchronization information.

More specifically, that the first device identifies the synchronization packet from the data stream in the physical layer encoding format may be as follows. The first device identifies a start code block in a data stream corresponding to an Ethernet frame (for example, a start code block in a 66B code block data stream corresponding to the Ethernet frame), and checks, in a data code block (for example, a D code block) in a subsequent Ethernet frame, a corresponding field that identifies a synchronization packet. If an identified packet is a synchronization packet, the first device extracts all code blocks between the start code block in the data stream corresponding to the Ethernet frame and a tail code block (for example, a T code block) of a next Ethernet frame, and obtains the synchronization information through parsing.

Alternatively, the first device further decodes the data stream in the physical layer encoding format (for example, the 66B code block data stream), restores a MAC frame data stream in a MAC layer format, and makes identification by using a corresponding field that identifies a synchronization packet in a MAC frame. If an identified packet is a synchronization packet, the first device extracts the MAC frame, and obtains the synchronization information through parsing.

It should be noted that data information may be located between a plurality of pieces of synchronization information. During the identification, if an identified packet is not a synchronization packet, no processing is performed.

S302. The first device generates second synchronization information based on the first synchronization information.

This step is mainly to regenerate synchronization information. Specifically, the first device may regenerate, by using the 1588 time synchronization protocol, synchronization information based on the extracted first synchronization information and local clock information and by using a flexible optical transport network interface (FlexO) frame header as a timestamp reference point.

It should be noted that, the synchronization information extracted by the first device from the first service data stream may include two types of packets: a precision time protocol (PTP) packet and a synchronization status message (SSM) packet. The PTP packet is used to transfer information such as high-precision clock frequency, clock phase, and time. The SSM packet is used to transfer information such as clock source quality. The first device calculates a path delay and a time difference between a master clock and a slave clock based on the extracted first synchronization information and the local clock information, synchronizes a local clock (the slave clock) with the master clock, and regenerates, by using the FlexO frame header as the timestamp reference, a PTP packet including information such as high-precision clock frequency, clock phase, and time, and an SSM packet including information such as clock source quality. The second synchronization information includes the regenerated PTP packet and SSM packet. In other words, the second synchronization information is determined based on both the first synchronization information and the local clock information. It should be noted that a FlexO frame is merely an example, and another OTN interface (OTN frame) may also be used.

S303. The first device maps the second synchronization information and the to-be-transmitted service data stream to an optical carrier container.

The first device may map the second synchronization information to a slot corresponding to the second synchronization information in the optical carrier container, and map the to-be-transmitted service data stream to a slot corresponding to the to-be-transmitted service data stream in the optical carrier container. Alternatively, the first device maps the second synchronization information to an overhead area in the optical carrier container, and maps the to-be-transmitted service data stream to a slot corresponding to the to-be-transmitted service data stream in the optical carrier container.

Optionally, in one manner, the first device maps the to-be-transmitted service data stream to an optical data unit flexible (ODUflex) by using a generic mapping procedure (GMP) or an idle mapping procedure (IMP), and maps the second synchronization information to an overhead area of the ODUflex. Then, the first device maps the ODUflex to an optical data tributary unit Fn.ts (ODTUFn.ts), multiplexes the ODTUFn.ts into the optical carrier container, and adds a corresponding overhead.

ODTUFn.ts represents that the optical data tributary unit includes is slots (Tributary slot/Time slot, TS) of n×FlexOs (n FlexOs), where Fn represents n FlexOs. For example, ODTUFn.60 represents an optical data tributary unit including 60 500M slots of n×25G FlexO instance frames, where n is an integer greater than 0.

The slot in this application may be a branch slot, a tributary slot, a slot, or the like. This is not specifically limited.

Optionally, in another manner, the first device maps the to-be-transmitted service data stream to an ODUflex by using a GMP or an IMP, and then maps the ODUflex to an ODTUFn.ts, multiplexes the ODTUFn.ts into the optical carrier container, and adds a corresponding overhead. In addition, the first device encapsulates the second synchronization information into the overhead area of the optical carrier container, or a channel-associated mapping overhead area, or a dedicated slot of the optical carrier container, or a dedicated wavelength of the optical carrier container. For example, the second synchronization information is encapsulated onto an optical supervisory channel (OSC).

Optionally, in still another manner, the first device directly maps the to-be-transmitted service data stream to an ODTUFn.ts, multiplexes the ODTUFn.ts into the optical carrier container, and adds a corresponding overhead. The first device synchronously encapsulates the second synchronization information into the overhead area of the optical carrier container, or a channel-associated mapping overhead area, or a dedicated slot of the optical carrier container, or a dedicated wavelength of the optical carrier container. For example, the second synchronization information is encapsulated onto an OSC.

Specifically, when the second synchronization information is synchronously encapsulated into the overhead area of the optical carrier container, or the channel-associated mapping overhead area, or the dedicated slot of the optical carrier container, or the dedicated wavelength of the optical carrier container, the second synchronization information may be encapsulated into a GFP-F frame in a generic framing procedure-frame mapped (GFP-F) manner, and then the GFP-F frame is placed in the overhead area of the optical carrier container, or the channel-associated mapping overhead area, or the dedicated slot of the optical carrier container, or the dedicated wavelength of the optical carrier container.

It should be noted that the optical carrier container may carry a plurality of service data streams and synchronization information corresponding to each service data stream. When the second synchronization information is placed in the overhead area of the optical carrier container (for example, an overhead area of each of n×25G FlexO instance frames), an optical synchronization message channel (OSMC) location of each FlexO instance frame may be preferentially considered, a multiframe alignment signal (MFAS) is used as an indication for distinguishing, and OSMCs of different FlexO instance frames carry different synchronization information. For example, if the MFAS=0, the FlexO instance frame carries synchronization information corresponding to a $1^{st}$ service data stream, if the MFAS=1, the FlexO instance frame carries synchronization information corresponding to a $2^{nd}$ service data stream, and so on.

S304. The first device sends the optical carrier container.

S305. The second device receives the optical carrier container.

Herein, the second device may be an OTN device, and corresponds to the first device. Optionally, when the first device is an OTN transmit-end device, the second device is an OTN receive-end device.

S306. The second device obtains a second service data stream and third synchronization information from the optical carrier container through demapping.

The demapping process herein is an inverse process of mapping, by the first device, the second synchronization information and the to-be-transmitted service data stream to the optical carrier container.

Optionally, in an implementation, for example, the optical carrier container is n×25G FlexO instance frames, a plurality of ODTUFn.ts's are demultiplexed from a FlexO based on overhead information of the FlexO, and a corresponding ODUflex is obtained from the plurality of ODTUFn.ts's through demapping. Then, the second service data stream is obtained from a payload area of the ODUflex through demapping by using the GMP or the IMP, and the third synchronization information is obtained from an overhead area of the ODUflex through parsing.

Optionally, in another implementation, for example, the optical carrier container is n×25G FlexO instance frames, a plurality of ODTUFn.ts's are demultiplexed from a FlexO based on overhead information of the FlexO, and a corresponding ODUflex is obtained from the plurality of ODTUFn.ts's through demapping. Then, the second service data stream is obtained from a payload area of the ODUflex through demapping by using the GMP or the IMP. In addition, the third synchronization information is obtained, through parsing, from the overhead area of the optical carrier container, or the channel-associated mapping overhead area, or the dedicated slot of the optical carrier container, or the dedicated wavelength of the optical carrier container, for example, the OSC.

Optionally, in still another implementation, for example, the optical carrier container is n×25G FlexO instance frames, a plurality of second service data streams are directly obtained from a FlexO through demapping based on overhead information of the FlexO. To be specific, a plurality of ODTUFn.ts's are demultiplexed from the FlexO based on the overhead information of the FlexO, and the corresponding second service data stream is obtained from the plurality of ODTUFn.ts's through demapping. In addition, the third synchronization information is obtained, through parsing, from the overhead area of the optical carrier container, or the channel-associated mapping overhead area, or the dedicated slot of the optical carrier container, or the dedicated wavelength of the optical carrier container, for example, the OSC.

It should be noted that, when the third synchronization information is obtained from the overhead area of the optical carrier container, or the channel-associated mapping overhead area, or the dedicated slot of the optical carrier container, or the dedicated wavelength of the optical carrier container through parsing, the GFP-F frame may be extracted first, and then the third synchronization information is obtained from the GFP-F frame through parsing. However, this is not limited thereto.

S307. The second device generates fourth synchronization information based on the third synchronization information.

This step is also mainly to regenerate synchronization information. For a specific process, refer to the process in which the first device generates the second synchronization information based on the first synchronization information. Details are not described herein again.

S308. The second device inserts the fourth synchronization information into the second service data stream, to obtain a third service data stream.

In this embodiment, the first device obtains the first synchronization information from the first service data stream, and determines the to-be-transmitted service data stream, generates the second synchronization information based on the first synchronization information, maps the second synchronization information and the to-be-transmitted service data stream to the optical carrier container, and sends the optical carrier container. After receiving the optical carrier container, the second device may obtain the second service data stream and the third synchronization information in the optical carrier container, and may further regenerate the fourth synchronization information based on the third synchronization information, insert the regenerated fourth synchronization information into the second service data stream, to obtain the third service data stream. This implements regeneration of the synchronization information by the optical network device, and improves precision of time synchronization.

In a specific implementation, the first device may receive a plurality of service data streams, and first classifies packets in the data streams. In other words, classification of data frames included in the service data streams is performed, that is, a packet of an eCPRI data type, a packet of a control and management type, and a packet of a synchronization type in the service data streams are distinguished from each other. Then, the packet of the eCPRI data type forms a new service data stream, the packet of the control and management type forms a new service data stream, and the packet of the synchronization type forms a new service data stream. A new packet of the synchronization type is regenerated from the packet of the synchronization type, and then the regenerated packet of the synchronization type is mapped to the optical carrier container. Correspondingly, the packet of the eCPRI data type and the packet of the control and management type are also mapped to the optical carrier container for sending. For details, refer to an embodiment shown in FIG. 14. Details are not described herein. However, this is not limited thereto. The packet of the eCPRI data type and the packet of the control and management type may be directly and transparently transmitted.

It should be noted that, if there is another OTN device (which is denoted as a "transit OTN device") between the first device and the second device, after receiving the optical carrier container sent by the first device, the transit OTN device obtains service data and synchronization information from the optical carrier container through demapping, regenerates synchronization information based on the synchronization information obtained through demapping, then maps the regenerated synchronization information to the optical carrier container together with a determined to-be-sent service data stream, and finally sends the optical carrier container to a next OTN device. In other words, after receiving the optical carrier container, the OTN nodes in the network shown in FIG. 1 perform a same processing process. Details are not described herein one by one.

Optionally, that the first device obtains the first synchronization information from the first service data stream sent by the second device, and determines the to-be-transmitted service data stream may specifically include obtaining, by the first device, the first synchronization information from the first service data stream sent by the second device, and deleting, by the first device, the first synchronization information from the first service data stream, to obtain the to-be-transmitted service data stream.

Certainly, the first synchronization information may alternatively not be deleted. In other words, the determined to-be-transmitted service data stream is the first service data stream. If the transmit-end device (namely, the first device) uses this manner, after receiving the second synchronization information and the to-be-transmitted service data stream, the second device replaces the synchronization information in the to-be-transmitted service data stream with the second synchronization information. On the basis of the foregoing embodiment, the second service data stream obtained by the second device through demapping may be the first service data stream, and the third synchronization information may be the second synchronization information.

Further, after deleting the first synchronization information from the first service data stream to obtain the to-be-transmitted service data stream, the first device may further mark a location of the first synchronization information in the to-be-transmitted service data stream.

It should be noted that, if the first device identifies the synchronization packet from the data stream in the physical layer encoding format, the first device may insert an idle code block (for example, an IDLE code block) between Ethernet frames into a location at which the first synchronization information is extracted, to perform rate adaptation, or may insert a special pattern code block or the like into a location at which the first synchronization information is extracted, to mark the location of the first synchronization information. The special pattern code block may be a preset pattern code block. This is not limited herein. The to-be-transmitted service data stream from which the first synchronization information is deleted no longer includes the synchronization packet, and may be specifically a 66B code block stream.

In a case of inserting an IDLE code block, alternatively, rate adaptation may be performed simply after the first synchronization information is deleted. In this case, the inserted IDLE code block is not necessarily at the location of the original first synchronization information.

Alternatively, if the first device identifies the synchronization packet from the MAC frame data stream in the MAC layer format, the first device may insert MAC inter-frame gap padding information, a MAC idle frame, or the like into the location at which the first synchronization information is extracted, to mark the location of the first synchronization information. The to-be-transmitted service data stream from which the first synchronization information is deleted no longer includes the synchronization packet, and may be specifically a MAC frame data stream. Similarly, the inserted MAC inter-frame gap padding information, MAC idle frame, or the like is not necessarily at the location of the original first synchronization information.

It should be noted that, that the second device inserts the fourth synchronization information into the second service data stream to obtain the third service data stream includes the following different cases.

In one case, the second service data stream does not include the synchronization information, that is, the first device deletes the synchronization information from the first service data stream in the foregoing embodiment. In this case, the second device inserts the fourth synchronization information into a synchronization information location marked in the second service data stream, that is, inserts the fourth synchronization information into a location, marked by the first device, of the first synchronization information. Specifically, the second device inserts the fourth synchronization information into the second service data stream based on a location marker of original synchronization information in the second service data stream, to obtain the third service data stream. Herein, the location marker of the original synchronization information may be a particular marker, or an idle frame or the like may be used as a marker, provided that the second device can learn a location into which the fourth synchronization information is to be inserted. Correspondingly, for the data stream in the physical layer format, the second device replaces the IDLE code block with the fourth synchronization information, or the second device replaces the special pattern code block with the fourth synchronization information. Alternatively, for the data stream in the MAC layer format, the second device replaces the MAC idle frame with the fourth synchronization information, or the second device replaces the MAC inter-frame gap padding information with the fourth synchronization information.

It should be noted that, the IDLE code block may not be at the location of the original first synchronization information. Therefore, after the IDLE code block is replaced with the fourth synchronization information, the fourth synchronization information may not be at the location of the original first synchronization information. This is not limited in this application. Similarly, the MAC inter-frame gap padding information or the MAC idle frame is not necessarily at the location of the original first synchronization information, and after the MAC inter-frame gap padding information or the MAC idle frame is replaced with the fourth synchronization information, the fourth synchronization information may not be at the location of the original first synchronization information.

In another case, the second service data stream includes the synchronization information, that is, includes the first synchronization information. In this case, the second device may replace the original synchronization information in the second service data stream with the fourth synchronization information.

Optionally, the optical carrier container in this application may be a flexible optical transport network frame structure, for example, n×25G FlexO instance frames, n×50G FlexO instance frames, or n×100G FlexO instance frames. The optical carrier container may alternatively be another OTN frame, for example, an optical transport unit-Cn (OTUCn), an optical transport unit-k (OTUk), or an optical transport unit-XXVn (OTUXXVn). The OTUCn is n×100G optical transport units, and the OTUXXVn is n×25G optical transport units.

The n×25G FlexO instance frames are used as an example. n×25G FlexOs may be used to transmit a plurality of service data streams, and the to-be-transmitted service data stream sent by the first device may be one of the service data streams.

The n×25G FlexO instance frames differ from n×G flexible optical transport network short-reach interfaces (FlexO-SR) defined in the current standard G.709.1. Specifically, in the n×100G FlexO-SRs, each FlexO-SR is 100G, and synchronous mapping is performed on an optical transport unit-C (OTUC) signal, to carry an OTUCn signal. Because there is no slot division, the n×100G FlexO-SRs cannot carry a small-granularity service or carry a plurality of services with different rates in a hybrid manner. The optical carrier container selected in this application, namely, the n×25G FlexO instance frames, has an extended definition on the basis of the FlexO-SR. A slot concept and asynchronous mapping are introduced, so that a plurality of service data streams with different rates can be carried in a hybrid manner, and synchronization information corresponding to the plurality of service data streams can be carried.

The n×25G FlexO (n 25G FlexOs) instance frames are used as an example. The n×25G FlexO instance frames are essentially a transmission interface, including n logical interfaces. One 25G FlexO instance frame is a basic frame of the transmission interface. Each FlexO instance frame is divided into 48 500M (M) slot, and therefore the n×25G FlexO instance frames include 48×n 500M slots in total.

Figure 5:
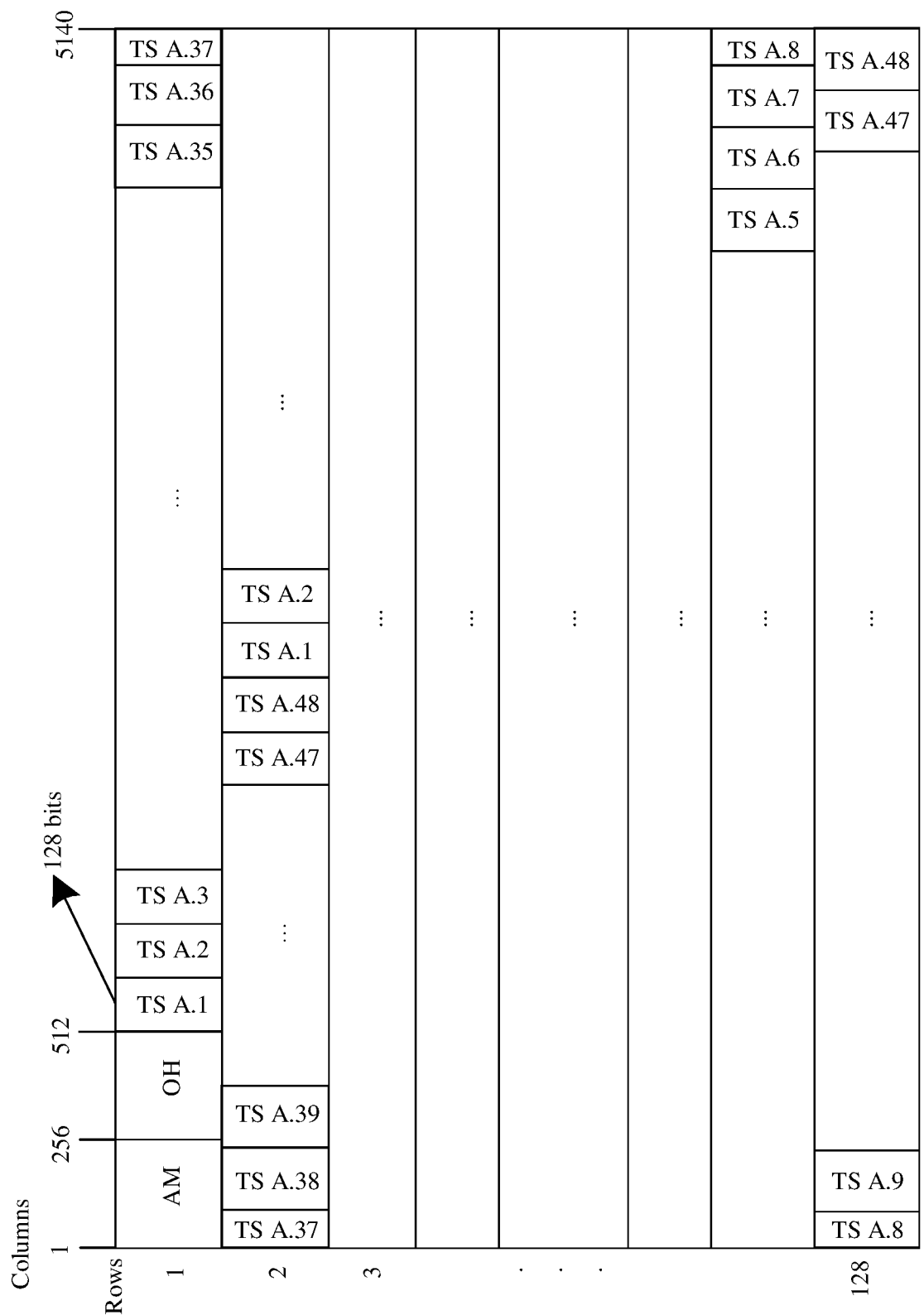
FIG. 5 is a schematic structural diagram of an optical carrier container according to an embodiment of this application.

FIG. 5 is a schematic structural diagram of an optical carrier container according to an embodiment of this application. FIG. 6 is a schematic structural diagram of an optical carrier container according to another embodiment of this application.

As shown in FIG. 5, the n×25G FlexO instance frames each may specifically include three parts: an alignment marker (AM), an overhead (OH) area, and a payload area, including 128 rows by 5,140 1-bit columns in total. The payload area may be divided into a plurality of slots, so that synchronization information and a service data stream are mapped to corresponding slots.

The AM is 256 bits, the OH area is 256 bits, and the payload area is (128×5140-512) bits. The payload area of the 25G FlexO instance frame is divided into 48 slots sequentially at a granularity of 16 bytes, with a rate of 500 M per slot. A payload area of each 25G FlexO instance frame includes 48×107 16-byte blocks, and each slot has exactly 107 16-byte blocks in each 25G FlexO instance frame.

As shown in FIG. 6, each row of the 25G FlexO instance frame is 5,140 bits, and the 5,140 bits are not an integer multiple of 16 bytes (B). Therefore, for ease of presentation, 128 rows may be combined as a superrow, that is, one 25G FlexO instance frame is presented as a superrow, and each superrow includes 5140×16B.

Figures 7A, 7B:
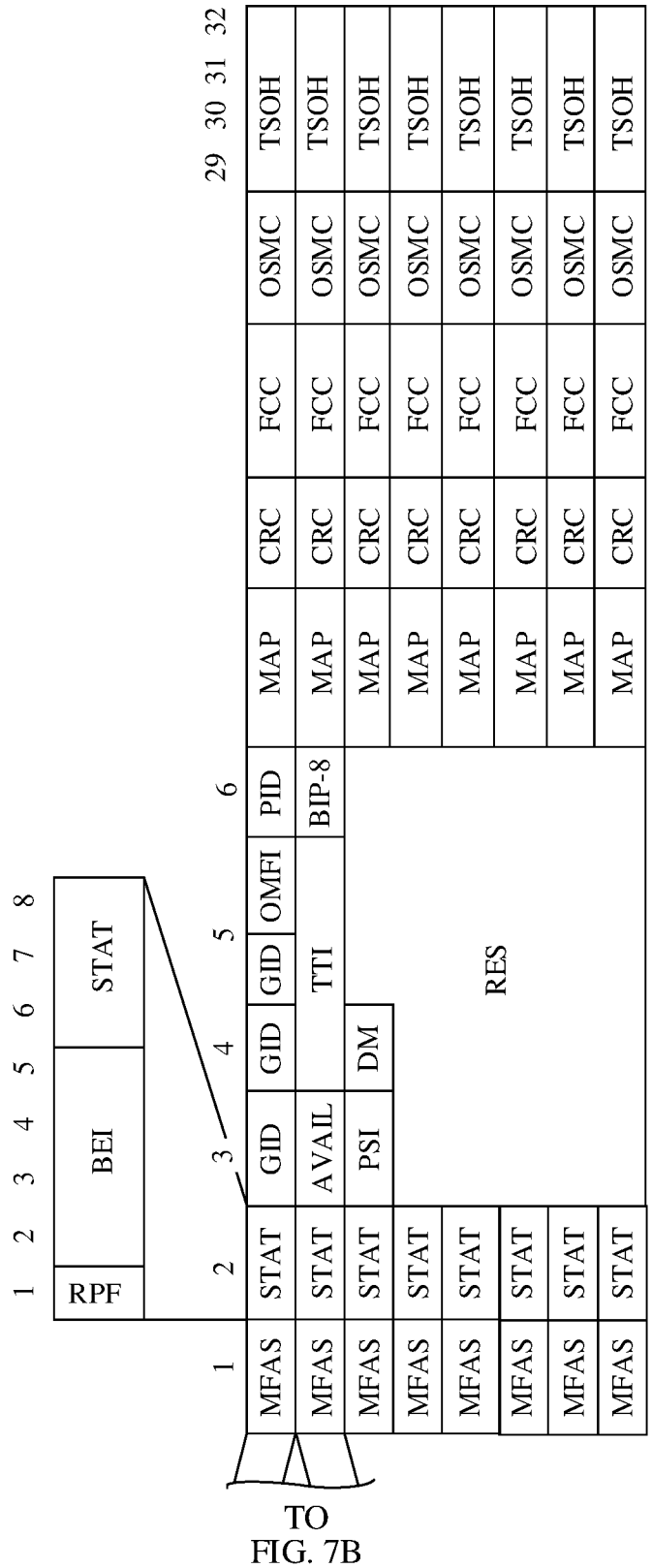
FIG. 7A and FIG. 7B are a schematic structural diagram of an optical carrier container according to still another embodiment of this application.
Figure 7B:
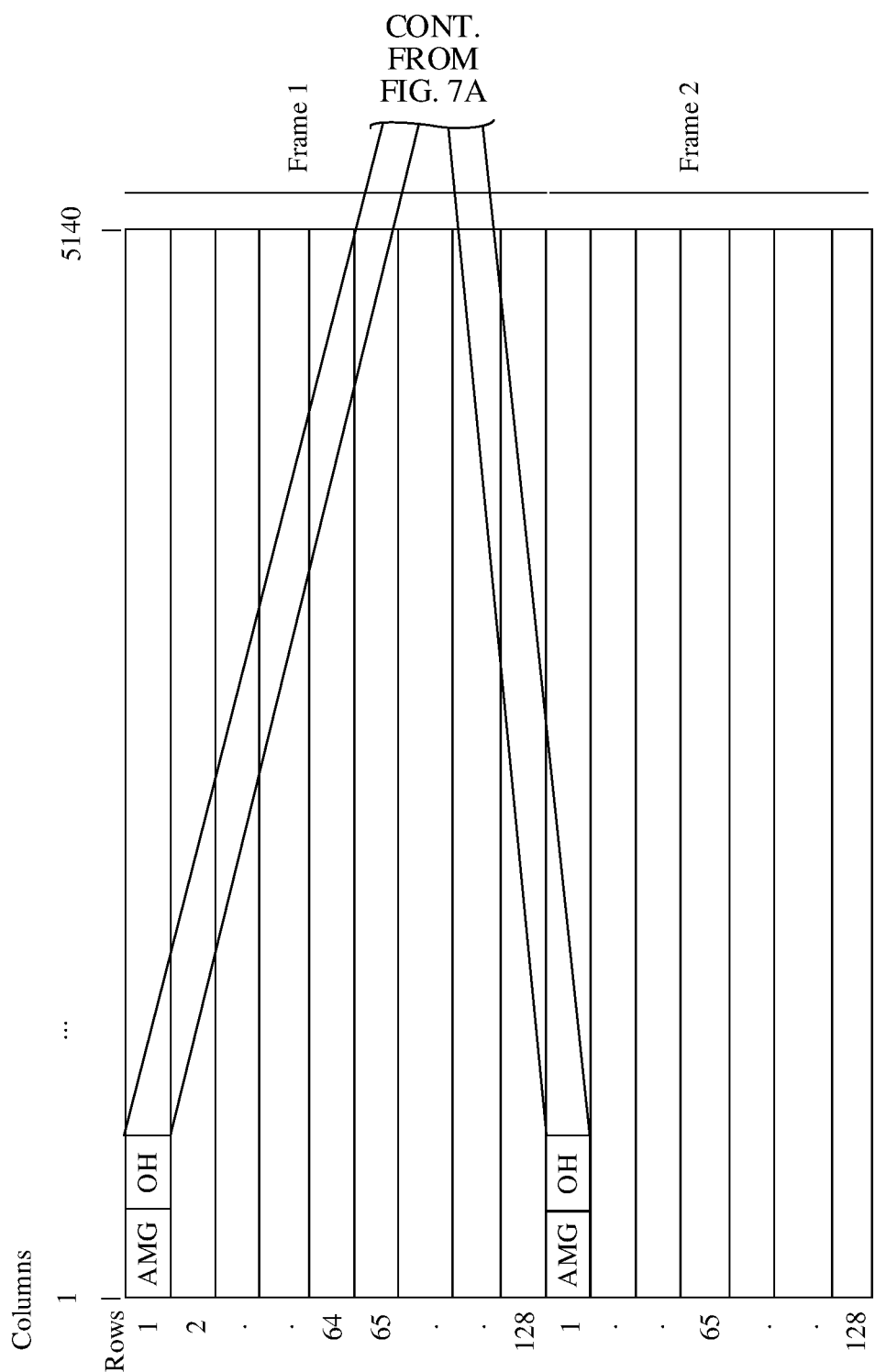

FIG. 7A and FIG. 7B are a schematic structural diagram of an optical carrier container according to still another embodiment of this application. FIG. 7A and FIG. 7B show a structure of an overhead area in each of n×25G FlexO instance frames.

As shown in FIG. 7A and FIG. 7B, on the basis of the existing standard, the following overheads are added to an overhead area of each of the n×25G FlexO instance frames in this application: a trail trace identifier (TTI) overhead, a state (State) overhead, a bit interleaved parity-8 (BIP-8) overhead, a back error indication (BEI), a delay measurement (DM) overhead, a payload structure indication (PSI) overhead, a tributary slot overhead (TSOH), and an optical multiframe identifier (OMFI) overhead.

The TTI overhead, the state overhead, the BIP-8 overhead, the BEI overhead, and the DM overhead are channel layer supervisory overheads. The PSI overhead is a multiplex section overhead.

Specifically, the TTI overhead occupies two bytes in each 8-frame multiframe (which is constituted by eight FlexO instance frames) of each FlexO, and the two bytes may be the fourth byte and the fifth byte in an overhead area of the second FlexO instance frame of the 8-frame multiframe. The state overhead occupies three bits in each FlexO instance frame, and the three bits are the sixth to the eighth bits of the second byte in an overhead area of each FlexO instance frame. The BEI overhead occupies four bits in each 8-frame multiframe of each FlexO, and the four bits may be the second to the fifth bits of the second byte in an overhead area of the first FlexO instance frame of the 8-frame multiframe. The BIP-8 overhead occupies one byte in each 8-frame multiframe of each FlexO, and the byte may be the sixth byte in an overhead area of the second FlexO instance frame of the 8-frame multiframe. The DM overhead occupies one byte in each 8-frame multiframe of each FlexO, and the byte may be the fourth byte in an overhead area of the third FlexO instance frame of the 8-frame multiframe. The PSI overhead occupies one byte in each 8-frame multiframe of each FlexO, and the byte may be the third byte in an overhead area of the third FlexO instance frame of the 8-frame multiframe, and is used to indicate a status of occupying each slot in a FlexO instance frame by each service. The OMFI overhead occupies three bits in each 8-frame multiframe of each FlexO, and the three bits may be the thirty-eighth to the fortieth bits in an overhead area of the first FlexO instance frame of the 8-frame multiframe. A value of the OMFI overhead ranges from 0 to 5, and a value of an OMFI overhead of each 8-frame multiframe increases by 1. The TSOH occupies four bytes in each FlexO instance frame of each FlexO, and the four bytes may be the twenty-ninth to the thirty-second bytes in an overhead area of each FlexO instance frame. Specifically, one slot overhead corresponding to each slot may be indicated by using an OMFI and an MFAS.

As shown in Table 1, a manner of indicating the TSOH by using the OMFI and the MFAS is described by using an example.

TABLE 1

| MFAS bits 678 | OMFI | TSOH |
| --- | --- | --- |
| 000 | 000 | A.1 |
| 001 |  | A.2 |
| ... |  | ... |
| 111 |  | A.8 |
| 000 | 001 | A.9 |
| 001 |  | A.10 |
| ... |  | ... |
| 111 |  | A.16 |
| 000 | 010 | A.17 |
| 001 |  | A.18 |
| ... |  | ... |
| 111 |  | A.24 |
| 000 | 011 | A.25 |
| 001 |  | A.26 |
| ... |  | ... |
| 111 |  | A.32 |
| 000 | 100 | A.33 |
| 001 |  | A.34 |
| ... |  | ... |
| 111 |  | A.40 |
| 000 | 101 | A.41 |
| 001 |  | A.42 |
| ... |  | ... |
| 111 |  | A.48 |

Further, the overhead area further includes a multiframe Alignment (MFAS) overhead, a reserved (RES) overhead, a device mapping (PHY/member map, MAP) overhead, a group identification (GID) overhead, a cyclic redundancy check (CRC) overhead, a device identification (PID) overhead, a FlexO communications channel (FCC), an optical transport unit-C availability (OTUC Availability, AVAIL) overhead, an OTN synchronization message channel (OSMC) overhead, and the like.

Figure 8A:
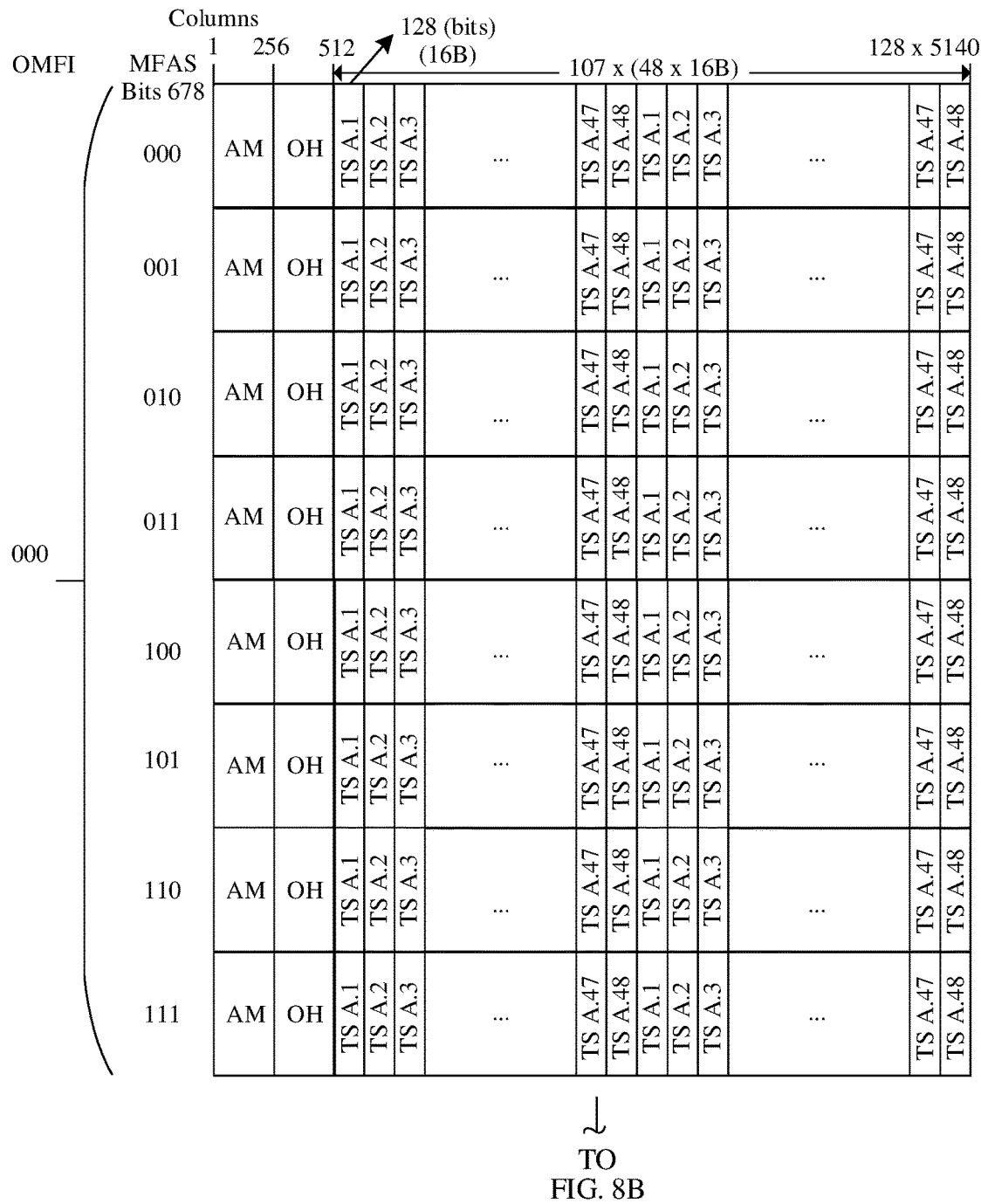

FIG. 8A, FIG. 8B, and FIG. 8C are a schematic structural diagram of an optical carrier container according to yet another embodiment of this application.

As shown in FIG. 8A, FIG. 8B, and FIG. 8C, when a plurality of services are multiplexed into the optical carrier container, 48 25G FlexO instance frames constitute one multiframe, and the multiframe is divided into 48 slots at a granularity of 16 bytes, with each slot including 5136×16 bytes.

The "OMFI overhead" and bits 6, 7, and 8 of the "MFAS overhead" (which is denoted as MFAS[678]) in the foregoing overhead area may be used to indicate the multiframe. Specifically, for the OMFI overhead, a count value starts from 0 and increases by 1 every eight frames. Once the count value reaches 5, counting starts over again. For example, OMFI=binary 000 and MFAS[678]=binary 000 represent the first frame, OMFI=binary 000 and MFAS[678]=binary 001 represent the second frame, by analogy, OMFI=binary 101 and MFAS[678]=binary 111 represent the forty-eighth frame.

For example, in the foregoing embodiment, that the ODUflex is mapped to the ODTUFn.ts, and then the ODTUFn.ts is multiplexed into the optical carrier container may be specifically described with reference to FIG. 8A, FIG. 8B, and FIG. 8C as follows.

For example, a 25GE service is mapped into an ODUflex, which is denoted as an ODUflex(25GE). Then, the ODUflex (25GE) is mapped to an ODTUFn.48 (which is constituted by 48 500 M slots of n×25G FlexOs) by using a GMP, and then the ODTUFn.48 is multiplexed into the n×25G FlexOs, where the ODTUFn.48 occupies the 48 500 M slots of the n×25G FlexOs.

Figure 9:
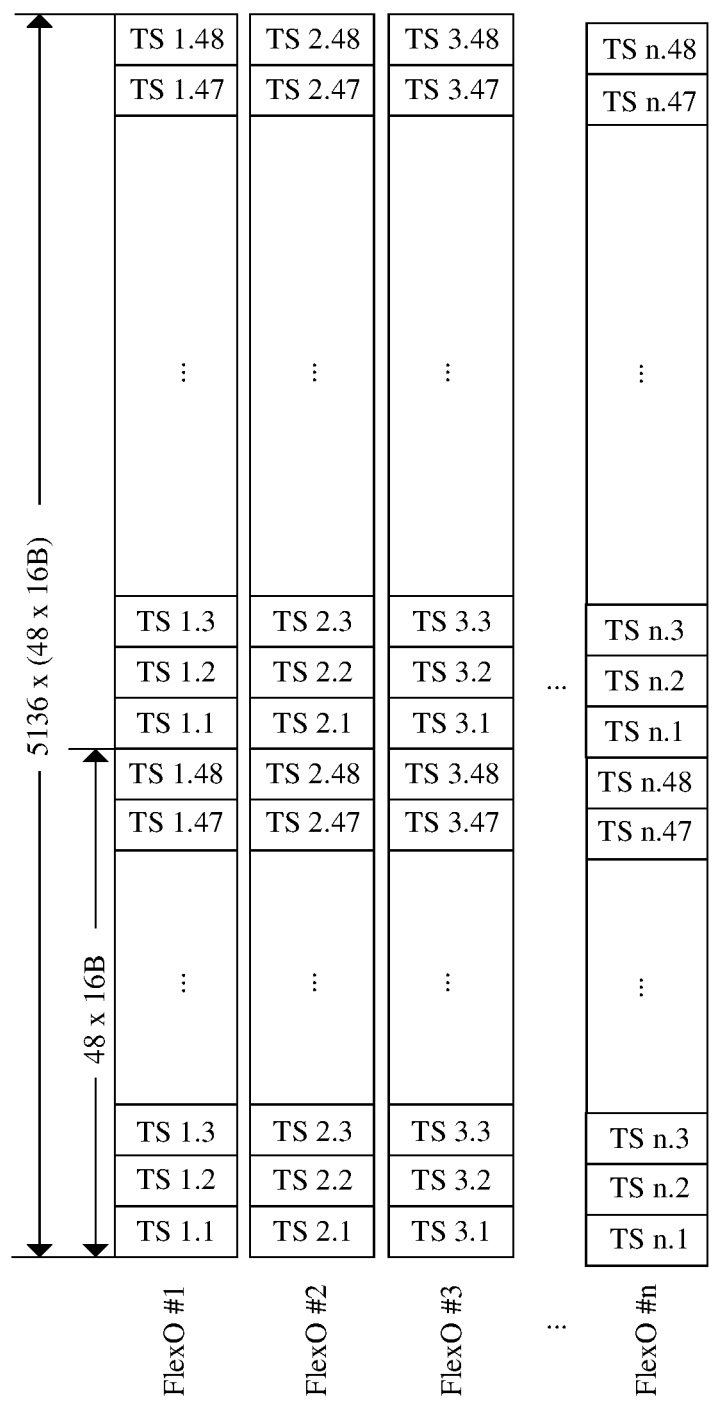
FIG. 9 is a schematic diagram of distribution of slots in an optical carrier container according to an embodiment of this application.
Figure 10:
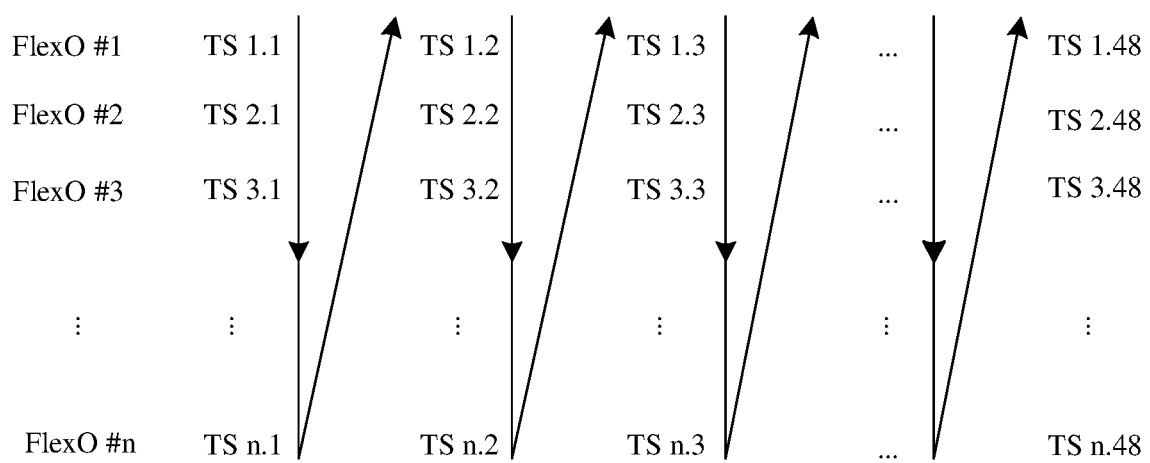
FIG. 10 is a schematic diagram of a sequence of slots in an optical carrier container according to an embodiment of this application.

FIG. 9 is a schematic diagram of distribution of slots in an optical carrier container according to an embodiment of this application. FIG. 10 is a schematic diagram of a sequence of slots in an optical carrier container according to an embodiment of this application.

n×25G FlexOs may be divided into 48 500 M slots. For numbers and a sequence of the 48 slots, refer to FIG. 9 and FIG. 10.

As shown in FIG. 9, a format of a slot number in this application is TS A.B. A represents a number of a 25G FlexO instance frame, and A is an integer greater than o and less than or equal to n. B represents a number of a slot in each 25G FlexO instance frame, and B is an integer greater than 0 and less than or equal to 48.

As shown in FIG. 10, the sequence of the slots is: TS 1.1, TS 2.1, . . . , TS n.1, TS 1.2, TS 2.2, . . . , TS n.2, . . . , TS 1.48, TS 2.48, . . . , TS n.48.

Figure 11:
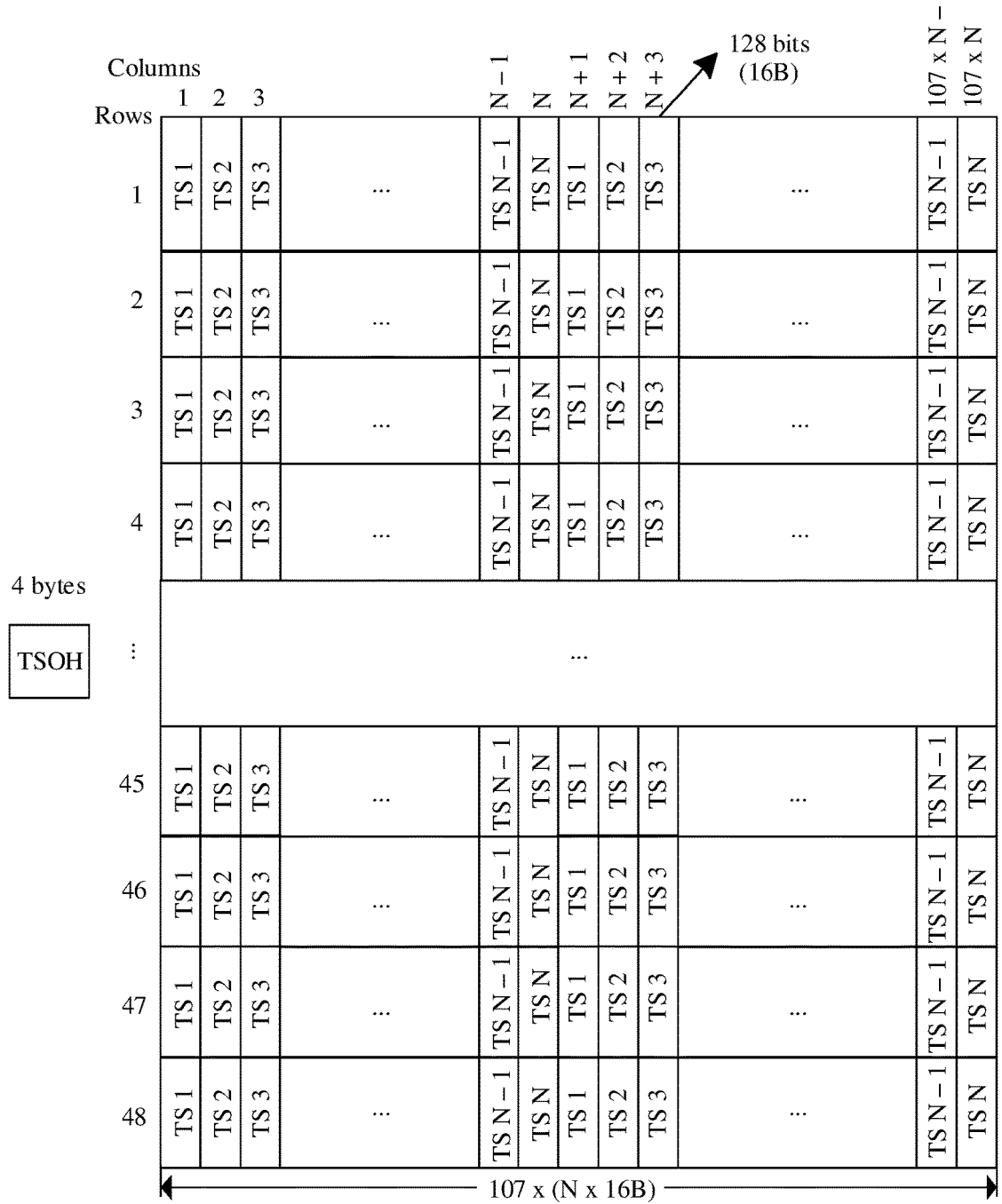
FIG. 11 is a schematic diagram of a slot overhead indication according to an embodiment of this application.

FIG. 11 is a schematic diagram of a slot overhead indication according to an embodiment of this application.

As described in the foregoing embodiment, when a plurality of service data streams are mapped to n×25G FlexO instance frames, the plurality of service data streams need to be mapped to ODTUFn.ts's respectively, and then the plurality of ODTUFn.ts's are multiplexed into the n×25G FlexO instance frames. In other words, the first device maps a plurality of to-be-transmitted service data streams or a plurality of ODUflexes encapsulated with to-be-transmitted service data streams to the plurality of ODTUFn.ts's, and a mapping overhead is placed at the last slot overhead location in a slot occupied by the plurality of to-be-transmitted service data streams or the plurality of ODUflexes encapsulated with the to-be-transmitted service data streams.

The mapping overhead herein is specifically mapping overhead information generated when the service data stream is mapped to the ODTUFn.ts, and is placed in the TSOH.

FIG. 11 shows a structure of an ODTUFn.ts. The ODTUFn.ts is constituted by ts slots in column-wise interleaved manner, including 48 rows by 107×N columns in total, with each column being 16 bytes in size. In addition, the ODTUFn.ts further includes one TSOH, and the TSOH is a slot overhead corresponding to the last slot.

Figures 12, 13:
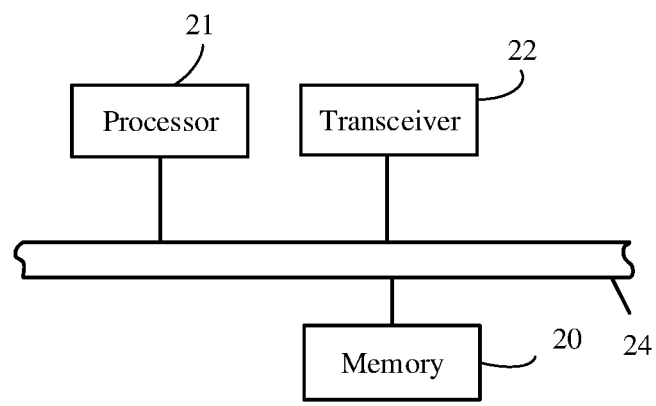
FIG. 12 is a schematic structural diagram of a slot overhead according to an embodiment of this application.
FIG. 13 is a schematic structural diagram of an optical network device according to an embodiment of this application.

FIG. 12 is a schematic structural diagram of a slot overhead according to an embodiment of this application.

When a service data stream is mapped to an ODTUFn.ts by using a GMP, a mapping overhead of the ODTUFn.ts is placed in a TSOH corresponding to the last slot of the ODTUFn.ts. The TSOH is the twenty-ninth to the thirty-second bytes in an overhead area of each 25G FlexO instance frame.

As shown in FIG. 12, the TSOH specifically includes 14-bit Ci (i is an integer ranging from 1 to 14, and the 14-bit Ci is represented by Cm), 8-bit Dj (j is an integer ranging from 1 to 8, and the 8-bit Dj is represented by CnD), and 8-bit CRC-8. Cm indicates a quantity of service data streams mapped to the ODTUFn.ts, and a unit of Cm is 16 bytes. CnD indicates service clock (clock) information generated when the service data stream is mapped to the ODTUFn.ts. CRC-8 covers both Cm and CnD. An existing definition in G.709 may be reused as a specific generator polynomial, for example, $x^8+x^3+x^2+1$, where x represents a specific variable of the generator polynomial.

FIG. 13 is a schematic structural diagram of an optical network device according to an embodiment of this application. As shown in FIG. 13, the device includes a processor 21 and a transceiver 22.

Optionally, the device may further include a memory 20, where the memory 20, the processor 21, and the transceiver 22 may be connected by using a bus 24. Specifically, the transceiver 22 may include a transmitter and a receiver. Alternatively, the transceiver 22 is an independent device, and may have a sending function and a receiving function.

The device may be the optical network device that is configured to implement different actions mentioned in the foregoing embodiments, and perform the method provided in the foregoing method embodiment. Implementation principles and technical effects thereof are similar, and details are not described herein again.

In a possible implementation, the optical network device is the first device, and is configured to perform the actions performed by the first device.

In another possible implementation, the optical network device is the second device, and is configured to perform the actions performed by the second device.

It should be noted that, in the diagram of the OTN hardware structure shown in FIG. 2, the units may be located in the line board and/or the tributary board. A location of each unit in a specific board is not limited in this application.

It should be further noted that the frame structures used by the device or the node are various frame structures described in the "general overview". A specific frame structure design may be selected as required. This is not limited in this application.

In another aspect, in the prior art, during transmission by using an optical carrier container, a received service data stream is directly encapsulated into a MAC frame, and is directly and transparently transmitted in an optical network through an Ethernet interface (for example, 10GE or 25GE) with a fixed rate. This causes a serious bandwidth waste and reduces transmission efficiency. This application provides a data transmission method, to transmit packets in a service data stream after classification, so as to improve transmission efficiency.

Figure 14:
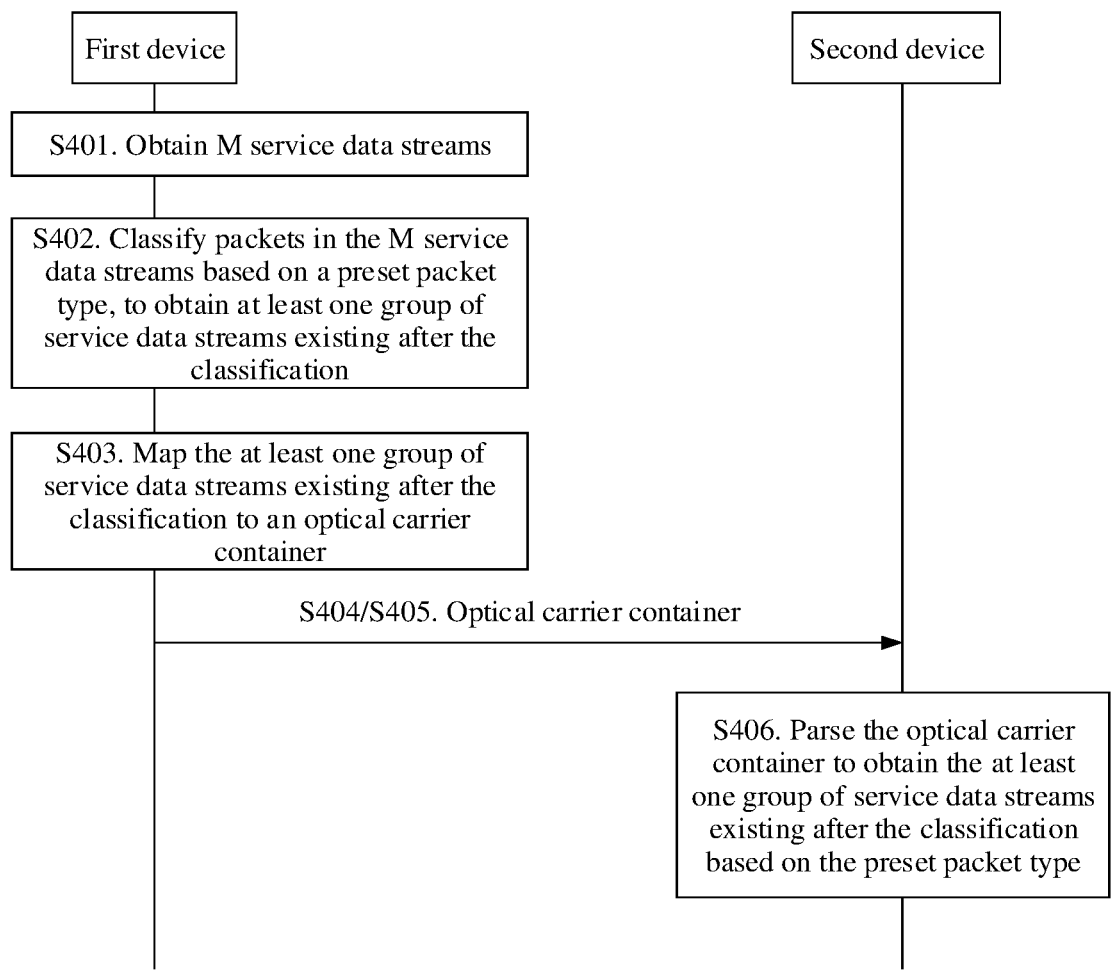
FIG. 14 is a schematic flowchart of a data transmission method in an optical network according to another embodiment of this application.

FIG. 14 is a schematic flowchart of a data transmission method in an optical network according to another embodiment of this application. As shown in FIG. 14, the method includes the following steps.

S401. A first device obtains M service data streams, where M is an integer greater than or equal to 2.

The service data stream may be a 10GE or 25GE Ethernet data stream, or may be an Ethernet data stream with a higher rate, for example, 100GE.

S402. The first device classifies packets in the M service data streams based on a preset packet type, to obtain at least one group of service data streams.

Referring to FIG. 4, service data streams are all encapsulated into MAC frames at a MAC layer, Ethernet physical encoding processing is performed on the MAC frames at a physical (PHY) layer, and then the MAC frames are sent through a standard Ethernet interface. After obtaining the service data streams, the first device may obtain a MAC layer identifier in each packet through parsing, and identify a type of the packet by using the MAC layer identifier. The MAC layer identifier may be an identifier added for the service data stream at the MAC layer, for example, may be a virtual local area network identifier (VLAN ID).

The packets are classified according to the identified packet type.

The service data streams include packets of a preset packet type, and other unnecessary information such as padding information in the service data streams is deleted during the classification, so that subsequent transmission resources can be saved.

S403. The first device maps the at least one group of service data streams to an optical carrier container.

S404. The first device sends the optical carrier container.

S405. The second device receives the optical carrier container sent by the first device.

S406. The second device parses the optical carrier container to obtain the at least one group of service data streams based on the preset packet type.

In other words, after receiving the optical carrier container, the second device obtains the packets in the optical carrier container through parsing. The at least one group of service data streams based on the preset packet type are the service data streams by the first device. Specifically, the service data streams are obtained by reorganizing the classified packets in the M service data streams.

In this embodiment, the packets in the service data streams are classified based on the preset packet type, then the classified packets are reorganized into the at least one group of service data streams, and the at least one group of service data streams are mapped to the optical carrier container for sending. After receiving the optical carrier container, the second device obtains these packets through parsing. Without transparently transmitting the service data streams as a whole, classification and reorganization reduce bandwidth waste and improve transmission efficiency.

In a specific implementation method, that the first device classifies packets in the M service data streams based on a preset packet type, to obtain at least one group of service data streams may be classifying the packets in the M service data streams based on an eCPRI data type, a control and management (C&M) type, and a synchronization type, to obtain the at least one group of service data streams.

Specifically, the packets in the M service data streams may be classified into one group, two groups, or three groups of service data streams. Assuming that a packet of the eCPRI data type, a packet of the control and management type, and a packet of the synchronization type in the M service data streams are classified into one category, all the service data streams are mapped to the optical carrier container after other padding information in the service data streams are deleted. Alternatively, the three types of packets are classified into three groups. Alternatively, two types of packets are classified into one group, and therefore there are two groups in total after the classification. This is not limited in this application.

In an optional solution, the packet of the eCPRI data type, the packet of the control and management type, and the packet of the synchronization type in the M service data streams are classified into three categories.

Correspondingly, that the first device maps the at least one group of service data streams to an optical carrier container may include at least one of the following.

(1) Map the packet of the eCPRI data type in each service data stream to the optical carrier container.

To be specific, in the M service data streams, the packet of the eCPRI data type in each service data stream is separately processed, and is mapped to the optical carrier container. In a specific manner, the packet of the eCPRI data type in each service data stream is directly mapped to an optical data tributary unit of the optical carrier container. For example, M packets of the eCPRI data type are mapped to M optical tributary units.

Specifically, the packet of the eCPRI data type in each service data stream may be mapped to the optical tributary unit by using a GMP mapping method. Alternatively, the packet of the eCPRI data type in each service data stream may be mapped to the optical tributary unit by using an eCPRI pointer mapping procedure (eCPRI pointer Mapping Procedure, ePMP). After the mapping is completed, mapping information may be added to the optical carrier container. For example, the mapping information may be added to an overhead area of the optical carrier container.

After receiving the optical carrier container, the second device directly obtains the packet of the eCPRI data type from the optical data tributary unit through demapping in the GMP or ePMP mapping manner based on the mapping information.

In another specific manner, the packet of the eCPRI data type in each service data stream is first mapped to an ODUflex, and then the ODUflex is mapped to an optical tributary unit. The packet of the eCPRI data type in each service data stream may be mapped to the ODUflex by using a BMP, IMP, or ePMP mapping method. Then, the ODUflex is mapped to the optical tributary unit by using a GMP mapping method. This is not specifically limited in this application. After the mapping is completed, mapping information may be added to the optical carrier container. Optionally, the mapping information may be added to an overhead area of the optical carrier container. Optionally, PT=0x81 is added to a payload type overhead area, to indicate ePMP mapping.

Correspondingly, after receiving the optical carrier container, the second device may first obtain, based on the mapping information included in the optical carrier container, the ODUflex from the optical data tributary unit through demapping by using the BMP, IMP, or ePMP mapping method, and then obtain an eCPRI data packet from the ODUflex through demapping.

(2) The first device combines all packets of the control and management type in the M service data streams, and maps a combined packet of the control and management type to the optical carrier container.

Optionally, all the packets of the control and management type in the M service data streams are mapped to one optical tributary unit. This can greatly save transmission resources. After the mapping is completed, mapping information may be added to the optical carrier container. Optionally, before the first device combines all the packets of the control and management type in the M service data streams, and maps the combined packet of the control and management type to the optical carrier container, the first device may add a data stream identifier to each packet of the control and management type. The data stream identifier is used to indicate a service data stream to which the packet of the control and management type belongs. During specific implementation, before all the packets of the control and management type in the M service data streams are combined, the packet of the control and management type in each service data stream may be first mapped to a cell (Cell) of the optical carrier container, and a data stream identifier is added to the packet. For example, there may be M cells.

Figures 15, 16:
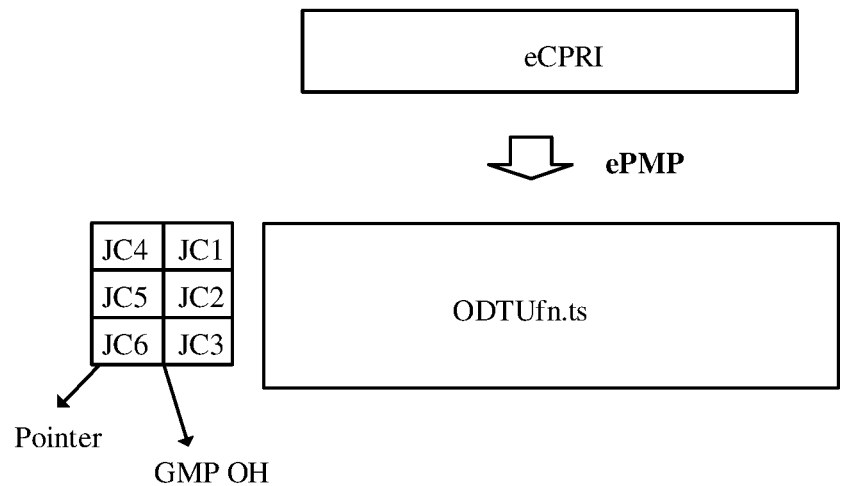
FIG. 15 is a schematic structural diagram of a cell.
FIG. 16 is a schematic diagram of a mapping process in a data transmission method in an optical network according to this application.

FIG. 15 is a schematic structural diagram of a cell. The cell may be a cell with a fixed length, for example, may be 128 bytes. Specifically, the cell includes a flag field, a payload length field, a payload area, and a check field. The flag field may include four bytes, used to record a data stream identifier, to distinguish between service data streams to which the packets of the control and management type belong. Each service data stream has a unique identifier. The payload length field may include two bytes, used to indicate a length of valid data carried in the payload area. A quantity of bytes in the payload area is fixed, and it is assumed that there are 121 bytes. The packet of the control and management type is mapped to the payload area. The check field may include one byte, and values generated in checking the former bytes (the flag field, the payload length field, and the payload area) in the cell are placed in the check field.

After the packets of the control and management type in all the service data streams are mapped to cells of the optical carrier container respectively, these cells are encapsulated into one optical tributary unit. Specifically, the cells may be sequentially encapsulated into corresponding locations in the optical tributary unit in a time sequence based on time information of the packets of the control and management type in the cells.

Assuming that the optical tributary unit includes ts×107×16 bytes, if a size of the cell is defined to be 128 bytes, it can be learned that ts×48×107×16/128=642 cells may be placed in a payload area of the optical tributary unit, and the cells and a boundary of the payload area of the optical tributary unit are aligned. It should be noted that ts represents a quantity of slots.

Correspondingly, when parsing the optical carrier container to obtain the at least one group of service data streams based on the preset packet type, the second device distinguishes and obtains packets of the control and management type through parsing based on the data stream identifier in the optical carrier container.

Specifically, before obtaining the control management packets through demapping, the second device first obtains cells from an optical data tributary unit through decapsulation, identifies data stream identifiers carried in the cells, deletes an idle cell, distinguishes the cells that carry M control management packets respectively, and then obtains the control management packets from the cells through demapping.

(3) The first device maps all packets of the synchronization type in the M service data streams to the optical carrier container.

Optionally, after classifying the packets of the synchronization type, referring to the embodiment shown in FIG. 3, the first device may perform regeneration on the packets of the synchronization type, obtain regenerated packets of the synchronization type, and map the regenerated packets of the synchronization type to the optical carrier container.

During specific implementation, the first device may combine all the regenerated packets of the synchronization type in the M service data streams and then map a combined packet of the synchronization type to one optical tributary unit, or may directly map all the regenerated packets of the synchronization type in the M service data streams to the optical carrier container.

In one manner, when the regenerated packets of the synchronization type are mapped to a same optical data tributary unit or an overhead area of the optical carrier container, a GFP-F mapping manner may be used to map the regenerated packets of the synchronization type to a GFP-F frame, and then the GFP-F frame is placed in the optical tributary unit or the overhead area of the optical carrier container.

When the regenerated packets of the synchronization type are encapsulated into the overhead area of the optical carrier container, the regenerated packets of the synchronization type may be preferentially placed at an OSMC location of each optical carrier container instance frame, an MFAS is used as an indication for distinguishing, and OSMCs of different optical carrier container instance frames carry regenerated packets of the synchronization type of different service data streams. For example, if the MFAS=0, the optical carrier container instance frame carries a regenerated packet of the synchronization type of a packet of the synchronization type of a $1^{st}$ service data stream, if the MFAS=1, the optical carrier container instance frame carries a regenerated packet of the synchronization type of a packet of the synchronization type of a $2^{nd}$ service data stream, and so on. Details are not described.

In another manner, the packets of the synchronization type in the M service data streams may be mapped to a mapping overhead area in the optical carrier container to which the packets of the eCPRI data type are mapped. Specifically, a packet of the synchronization type in a first service data stream may be mapped to a mapping overhead area in the optical carrier container to which a packet of the eCPRI data type in the first service data stream is mapped, and so on. Details are not described. Similar to the foregoing embodiment, the packet of the eCPRI data type in the first service data stream is first mapped to an ODUflex, and then the packet of the synchronization type in the first service data stream is mapped to an overhead area of the ODUflex.

After receiving the optical carrier container, the second device correspondingly extracts the packet of the synchronization type from the optical data tributary unit, the overhead area of the optical carrier container, or the mapping overhead area to which the packet of the eCPRI data type in the first service data stream is mapped.

Optionally, referring to the embodiment shown in FIG. 3, the second device may perform regeneration on the packet of the synchronization type that is obtained through parsing, and insert a regenerated packet of the synchronization type into a service data stream to be sent by the second device. Details are not described herein again.

In this application, adding the mapping information in the foregoing embodiment may be adding the mapping information to the overhead area of the optical carrier container.

In addition, it should be noted that, (1) is performed when the service data stream includes the packet of the eCPRI data type, (2) is performed when the service data stream includes the packet of the control and management type, and (3) is performed when the service data stream includes the packet of the synchronization type.

In another optional solution, the packet of the eCPRI data type, the packet of the control and management type, and the packet of the synchronization type in the M service data streams are classified into two categories. Specifically, the packet of the eCPRI data type and the packet of the synchronization type are classified into one group of service data streams, and the packet of the control and management type is classified into one group of service data streams, to obtain the at least one group of service data streams.

Correspondingly, that the first device maps the at least one group of service data streams to an optical carrier container may include at least one of the following.

(a) Map the packet of the eCPRI data type in each service data stream to the optical carrier container.

(b) The first device combines all packets of the control and management type in the M service data streams, and maps a combined packet of the control and management type to the optical carrier container.

For the two mapping manners (a) and (b), refer to the mapping manners (1) and (2), and details are not described herein again.

(c) The first device maps each packet of the synchronization type to an overhead area of a location in the optical carrier container to which a corresponding packet of the eCPRI data type is mapped.

It should be noted that, in this classification manner, the packet of the eCPRI data type and the packet of the synchronization type in each service data stream are classified into one group, and the packet of the synchronization type is not processed separately. In other words, regeneration on the packet of the synchronization type may not be performed.

The packet of the eCPRI data type and the packet of the synchronization type in each service data stream are mapped to a corresponding location in the optical carrier container.

Optionally, the packet of the eCPRI data type and the packet of the synchronization type in each service data stream are first mapped to one optical tributary unit, and then the optical tributary unit is mapped to the optical carrier container.

After receiving the optical carrier container, the second device reads the packet of the eCPRI data type and the packet of the synchronization type from the optical tributary unit.

Similar to the foregoing embodiment, the optical carrier container in this application may be a flexible optical transport network frame structure, for example, n×25G FlexO instance frames, n×50G FlexO instance frames, or n×100G FlexO instance frames. However, the optical carrier container is not limited thereto, and may alternatively be an OTUCn, an OTUXXVn, or the like.

For descriptions of the optical carrier container, refer to the descriptions in the embodiments shown in FIG. 5 to FIG. 12. Details are not described herein again. The optical tributary unit may be an ODTUFn.ts, an ODTUk.ts, an ODTUCn.ts, or the like. This is not limited in this application.

All the service data streams are mapped to optical tributary units and then are mapped to the optical carrier container. Specifically, the plurality of optical tributary units may be multiplexed into the optical carrier container, then a payload structure indication is added to the optical carrier container, and finally the optical carrier container is sent. For example, a plurality of different optical data tributary units ODTUFn.ts are multiplexed into an optical carrier container FlexO-n, a payload structure indication is added, and then the FlexO-n is sent.

Optionally, if the optical tributary unit is an ODTUk.ts, the optical carrier container is correspondingly an OTUk. Alternatively, if the optical tributary unit is an ODTUCn.ts, the optical carrier container is correspondingly an OTUCn.

In addition, (a) is performed when the service data stream includes the packet of the eCPRI data type, (b) is performed when the service data stream includes the packet of the control and management type, and (c) is performed when the service data stream includes the packet of the synchronization type.

It should be noted that the ePMP mapping manner shown in the foregoing embodiment is a new mapping manner proposed in this application. This mapping manner may be combined with any one of the mapping manners BMP, GMP, and IMP, and generates a pointer.

Specifically, after mapping the at least one group of service data streams to the optical carrier container, the first device generates indication information, and adds the indication information to the optical carrier container. The indication information is used to indicate a start location of the first eCPRI data packet of each packet of the eCPRI data type in the optical carrier container.

Correspondingly, the second device determines the start location of the first eCPRI data packet of each packet of the eCPRI data type in the optical carrier container based on the indication information in the optical carrier container, and further obtains the packet of the eCPRI data type based on the start location of the first eCPRI data packet of the packet of the eCPRI data type in the optical carrier container. Specifically, the indication information may be a piece of location information, and may be identified by using one or more bits. Optionally, the indication information is pointer (pointer) information.

During specific implementation, considering that a quantity of bytes of the packet of the eCPRI data type is not fixed, the packet of the eCPRI data type may be divided into an integer multiple of a preset quantity of bytes, for example, may be divided into an integer multiple of four bytes.

First, any one of a BMP, an IMP, and a GMP mapping method is used to map the packet of the eCPRI data type to the payload area of the optical carrier container at a mapping granularity of the preset quantity of bytes by using any one of the BMP, IMP, and GMP mapping manners. The packet of the eCPRI data type and a boundary of the optical carrier container are kept aligned in terms of the preset quantity of bytes. Then, the indication information is generated and added to the overhead area of the optical carrier container, where the indication information is used to indicate a location at which a packet header of the eCPRI data type first appears in the payload area of the optical carrier container, namely, the start location of the first eCPRI data packet of the packet of the eCPRI data type in the optical carrier container.

After receiving the optical carrier container, the second device determines a location of the packet of the eCPRI data type based on the indication information, to obtain the packet of the eCPRI data type through demapping, so that a processing delay can be reduced.

FIG. 16 is a schematic diagram of a mapping process in a data transmission method in an optical network according to this application.

Specifically, the foregoing manner of mapping the packet of the eCPRI data type in each service data stream to the optical tributary unit by using the ePMP is specifically as follows. The packet of the eCPRI data type is mapped to the payload area of the optical tributary unit at a granularity of the preset quantity of bytes by using the GMP. The packet of the eCPRI data type and the boundary of the payload area of the optical tributary unit are kept aligned in terms of the granularity of the preset quantity of bytes. Cm mapping information is generated, and Cm is used to indicate a quantity m and distribution of packets of the eCPRI data type carried in each frame, where m is an integer greater than 0. Optionally, m herein is 32, and the preset quantity of bytes may be four bytes, but is not limited thereto. Then, indication information is generated and added to the overhead area of the optical carrier container, where the indication information indicates a location at which a packet header of the eCPRI data type first appears in the payload area of the optical tributary unit.

Optionally, the indication information is added to an overhead area of the optical tributary unit, for example, placed at a TSOH location of a FlexO frame. After the mapping is completed, mapping information may be added to the optical carrier container. For example, PT=0×81 is added to the payload type overhead area, to indicate ePMP mapping.

Figure 17:
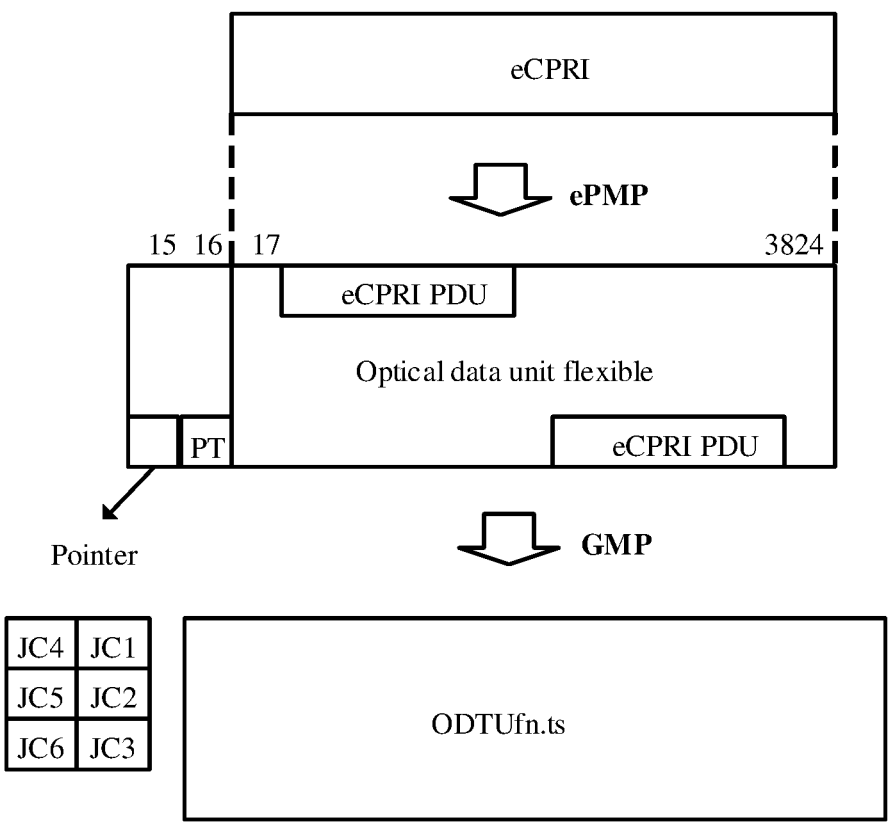
FIG. 17 is a schematic diagram of another mapping process in a data transmission method in an optical network according to this application.

FIG. 17 is a schematic diagram of another mapping process in a data transmission method in an optical network according to this application.

Specifically, the packet of the eCPRI data type is mapped to the payload area of the ODUflex at the granularity of the preset quantity of bytes by using the BMP or the IMP. The packet of the eCPRI data type and a boundary of the payload area of the ODUflex are kept aligned in terms of the granularity of the preset quantity of bytes. It is assumed that a rate of the ODUflex is 239/238×eCPRI_max, where eCPRI_max represents a maximum rate of the packet of the eCPRI data type. When the IMP mapping manner is used, rate adaptation is performed by extending a padding frame of the packet of the eCPRI data type. Further, indication information is generated and added to the overhead area of the ODUflex, for example, placed in row 4 and column 15 of an ODUflex frame. The indication information is used to indicate a location at which a packet header of the eCPRI data type first appears in the payload area of the optical carrier container, namely, the start location of the first eCPRI data packet of the packet of the eCPRI data type in the optical carrier container.

After the mapping is completed, mapping information may be added to the optical carrier container. For example, PT=0×81 is added to the payload type overhead area, to indicate ePMP mapping.

Figure 18:
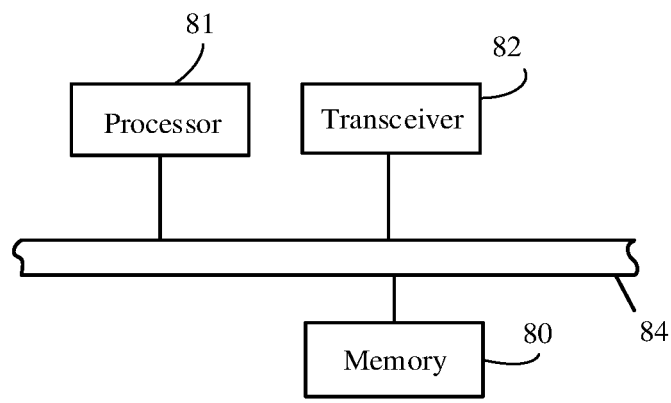
FIG. 18 is a schematic structural diagram of an optical network device according to another embodiment of this application.

FIG. 18 is a schematic structural diagram of an optical network device according to another embodiment of this application. The device includes a processor 81 and a transceiver 82. Optionally, the device may further include a memory 80, where the memory 80, the processor 81, and the transceiver 82 may be connected by using a bus 84.

Specifically, the transceiver 82 may include a transmitter and a receiver. Alternatively, the transceiver is an independent device, and may have a sending function and a receiving function.

The device may be the optical network device that is configured to implement different actions mentioned in the foregoing embodiments, and perform the method provided in the foregoing method embodiment. Implementation principles and technical effects thereof are similar, and details are not described herein again.

In a possible implementation, the optical network device is the first device, and is configured to perform the actions performed by the first device. In another possible implementation, the optical network device is the second device, and is configured to perform the actions performed by the second device.

It should be noted that, in the diagram of the OTN hardware structure shown in FIG. 2, the units may be located in the line board and/or the tributary board. A location of each unit in a specific board is not limited in this application.

It should be further noted that the frame structures used by the device or the node are various frame structures described in the "general overview". A specific frame structure design may be selected as required. This is not limited in this application.

A person of ordinary skill in the art may understand that all or some of the steps of the foregoing embodiments may be implemented by hardware or a program instructing related hardware. The program may be stored in a computer-readable storage medium. The storage medium may include a read-only memory, a random access memory, or the like. Specifically, for example, the foregoing processing unit or processor may be a central processing unit, a general-purpose processor, a digital signal processor (DSP), an application-specific integrated circuit (ASIC), a field programmable gate array (FPGA) or another programmable logic device, a transistor logic device, a hardware component, or any combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

When software is used to implement the embodiments, the method steps in the foregoing embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. A data transmission method in an optical network, comprising:
    obtaining, by a first device, first synchronization information from a first service data stream and determining a to-be-transmitted service data stream;
    generating, by the first device, second synchronization information according to the first synchronization information;
    mapping, by the first device, the second synchronization information and the to-be-transmitted service data stream to an optical carrier container; and
    sending, by the first device, the optical carrier container.

2. The method according to claim 1, wherein the obtaining the first synchronization information from the first service data stream and determining the to-be-transmitted service data stream comprises:
  obtaining, by the first device, the first synchronization information from the first service data stream; and
  obtaining the to-be-transmitted service data stream by deleting, by the first device, the first synchronization information from the first service data stream.

3. The method according to claim 2, further comprising:
  marking, by the first device, after the deleting the first synchronization information from the first service data stream, a location of the first synchronization information in the to-be-transmitted service data stream.

4. The method according to claim 1, wherein the to-be-transmitted service data stream is the first service data stream.

5. The method according to claim 1, wherein the mapping the second synchronization information and the to-be-transmitted service data stream to an optical carrier container comprises:
  mapping, by the first device, the second synchronization information to a slot corresponding to the second synchronization information in the optical carrier container; and
  mapping the to-be-transmitted service data stream to a slot corresponding to the to-be-transmitted service data stream in the optical carrier container.

6. The method according to claim 5, wherein the optical carrier container comprises a flexible optical transport network frame structure; and
  wherein the flexible optical transport network frame structure comprises an alignment marker, an overhead area, and a payload area, and wherein the payload area is divided into a plurality of slots.

7. The method according to claim 1, wherein the mapping the second synchronization information and the to-be-transmitted service data stream to an optical carrier container comprises:
  mapping, by the first device, the second synchronization information to an overhead area in the optical carrier container; and
  mapping the to-be-transmitted service data stream to a slot corresponding to the to-be-transmitted service data stream in the optical carrier container.

8. The method according to claim 7, wherein the optical carrier container comprises a flexible optical transport network frame structure; and
  wherein the flexible optical transport network frame structure comprises an alignment marker, an overhead area, and a payload area, and wherein the payload area is divided into a plurality of slots.

9. The method according to claim 1, wherein the optical carrier container comprises a flexible optical transport network frame structure; and
  wherein the flexible optical transport network frame structure comprises an alignment marker, an overhead area, and a payload area, and wherein the payload area is divided into a plurality of slots.

10. An optical network device, comprising:
  a processor; and
  a transceiver; and
  a non-transitory computer-readable storage medium storing a program to be executed by the processor, the program including instructions to:
    obtain first synchronization information from a first service data stream and determine a to-be-transmitted service data stream;
    generate second synchronization information according to the first synchronization information;
    map the second synchronization information and the to-be-transmitted service data stream to an optical carrier container; and
    cause the transceiver to send the optical carrier container.

11. The device according to claim 10, wherein the program further includes instructions to:
  obtain the first synchronization information from the first service data stream; and
  obtain the to-be-transmitted service data stream by deleting the first synchronization information from the first service data stream.

12. The device according to claim 11, wherein the program further includes instructions to mark a location of the first synchronization information in the to-be-transmitted service data stream.

13. The device according to claim 10, wherein the to-be-transmitted service data stream is the first service data stream.

14. The device according to claim 10, wherein the program further includes instructions to:
  map the second synchronization information to a slot corresponding to the second synchronization information in the optical carrier container; and
  map the to-be-transmitted service data stream to a slot corresponding to the to-be-transmitted service data stream in the optical carrier container.

15. The device according to claim 14, wherein the optical carrier container comprises a flexible optical transport network frame structure; and
  wherein the flexible optical transport network frame structure comprises an alignment marker, an overhead area, and a payload area, and wherein the payload area is divided into a plurality of slots.

16. The device according to claim 10, wherein the program further includes instructions to:
  map the second synchronization information to an overhead area in the optical carrier container; and
  map the to-be-transmitted service data stream to a slot corresponding to the to-be-transmitted service data stream in the optical carrier container.

17. The device according to claim 10, wherein the optical carrier container comprises a flexible optical transport network frame structure; and
  wherein the flexible optical transport network frame structure comprises an alignment marker, an overhead area, and a payload area, and wherein the payload area is divided into a plurality of slots.

18. An optical network device, comprising:
  a processor;
  a transceiver, configured to receive an optical carrier container; and
  a non-transitory computer-readable storage medium storing a program to be executed by the processor, the program including instructions to:
    obtain a first service data stream and first synchronization information from the optical carrier container through demapping;
    generate second synchronization information according to the first synchronization information; and insert the second synchronization information into the first service data stream, to obtain a second service data stream.

19. The device according to claim 18, wherein the program further includes instructions to, in response to the first service data stream having original synchronization information, obtain the second service data stream by replacing the original synchronization information with the second synchronization information.

20. The device according to claim 18, wherein the program further includes instructions to, in response to the first service data stream not having synchronization information, obtain the second service data stream by inserting the second synchronization information into the first service data stream according to a location marker of original synchronization information in the first service data stream.

* * * * *